United States Patent
Jung et al.

(10) Patent No.: US 10,884,274 B2
(45) Date of Patent: Jan. 5, 2021

(54) PLASTIC SUBSTRATE AND DEVICE INCLUDING THE SAME

(71) Applicant: KOLON INDUSTRIES, INC., Gwacheon-si (KR)

(72) Inventors: Hak Gee Jung, Yongin-si (KR); Jeong Han Kim, Seongnam-si (KR); Hyo Jun Park, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 460 days.

(21) Appl. No.: 15/644,619

(22) Filed: Jul. 7, 2017

(65) Prior Publication Data
US 2018/0004032 A1 Jan. 4, 2018

Related U.S. Application Data

(62) Division of application No. 13/001,958, filed as application No. PCT/KR2009/003568 on Jun. 30, 2009, now Pat. No. 9,733,503.

(30) Foreign Application Priority Data

| Jun. 30, 2008 | (KR) | 10-2008-0062975 |
| Sep. 23, 2008 | (KR) | 10-2008-0093049 |
| Sep. 24, 2008 | (KR) | 10-2008-0093645 |
| Jun. 26, 2009 | (KR) | 10-2009-0057591 |

(51) Int. Cl.
*G02F 1/1333* (2006.01)
*G02F 1/1343* (2006.01)

(52) U.S. Cl.
CPC .... *G02F 1/133305* (2013.01); *G02F 1/13439* (2013.01); *G02F 1/133345* (2013.01); *G02F 2201/50* (2013.01); *G02F 2201/503* (2013.01); *Y10T 428/269* (2015.01); *Y10T 428/31511* (2015.04); *Y10T 428/31678* (2015.04); *Y10T 428/31681* (2015.04)

(58) Field of Classification Search
CPC ......... G02F 1/133305; G02F 1/133345; G02F 1/13439; G02F 2201/50; G02F 2201/503; Y10T 428/269; Y10T 428/31511; Y10T 428/31678; Y10T 428/31681
See application file for complete search history.

(56) References Cited

U.S. PATENT DOCUMENTS

| 4,187,340 A | | 2/1980 | Oishi et al. | |
| 5,417,816 A | * | 5/1995 | Nakashima | C23C 14/3414 |
| | | | | 205/508 |
| 5,908,585 A | * | 6/1999 | Shibuta | H01B 1/14 |
| | | | | 252/506 |
| 6,157,127 A | * | 12/2000 | Hosokawa | H01L 27/3288 |
| | | | | 313/506 |

(Continued)

FOREIGN PATENT DOCUMENTS

| JP | 6-186550 A | 7/1994 |
| JP | 2001-337340 A | 12/2001 |

(Continued)

*Primary Examiner* — John D Freeman
(74) *Attorney, Agent, or Firm* — Sughrue Mion, PLLC

(57) ABSTRACT

Disclosed is a plastic substrate, which includes a plastic film, a metal layer, and a resin layer having a conductive material dispersed therein and which is useful as a lower substrate of a transmissive electronic paper display device or a display device.

38 Claims, 8 Drawing Sheets

(56) References Cited

U.S. PATENT DOCUMENTS

| | | | |
|---|---|---|---|
| 6,417,321 B1 * | 7/2002 | Minami | C08G 73/10 |
| | | | 343/700 R |
| 6,867,839 B2 | 3/2005 | McKnight | |
| 7,435,906 B2 | 10/2008 | Yasuda et al. | |
| 7,964,281 B2 | 6/2011 | Yasuda et al. | |
| 7,968,670 B2 | 6/2011 | Jung et al. | |
| 8,462,278 B2 | 6/2013 | Nashiki et al. | |
| 2002/0192445 A1 * | 12/2002 | Ezzell | C08G 73/10 |
| | | | 428/212 |
| 2004/0018364 A1 * | 1/2004 | Ota | B32B 27/06 |
| | | | 428/447 |
| 2007/0216657 A1 * | 9/2007 | Konicek | G06F 3/044 |
| | | | 345/173 |
| 2009/0295285 A1 * | 12/2009 | Tokunaga | H01L 51/5212 |
| | | | 313/505 |

FOREIGN PATENT DOCUMENTS

| | | | | |
|---|---|---|---|---|
| KR | 2002-0076849 A | 10/2002 | | |
| KR | 10-2007-0027452 A | 3/2007 | | |
| WO | WO-2008038764 A1 * | 4/2008 | | H01L 51/5212 |
| WO | 2008/072915 A1 | 6/2008 | | |

\* cited by examiner

PLASTIC SUBSTRATE AND DEVICE INCLUDING THE SAME

CROSS-REFERENCE TO RELATED APPLICATIONS

This application is a Rule 53(b) Divisional Application of U.S. application Ser. No. 13/001,958 (allowed) filed Mar. 2, 2011, which is a National Stage of International Application No. PCT/KR2009/003568 filed Jun. 30, 2009, which claims priority from Korean Patent Application Nos. 10-2008-0062975, filed Jun. 30, 2008, 10-2008-0093049 filed Sep. 23, 2008, 10-2008-0093645 filed Sep. 24, 2008, and 10-2009-0057591 filed Jun. 26, 2009, the contents of all of which are incorporated herein by reference in their entirety.

TECHNICAL FIELD

The present invention relates to a plastic substrate and a device including the same, and, more particularly, to a plastic substrate or a transparent electrode film for use in an electronic paper display device or a display device.

BACKGROUND ART

Conventionally, in almost all liquid crystal display devices, types of which include an electronic paper display device and a liquid crystal display device, a glass substrate has been utilized as the upper and lower substrates, and, in order to achieve lightness of weight of the display device, the upper and lower glass substrates have been made thinner. Currently, although the thickness of the substrate is maximally thinned, satisfactory lightness of weight is difficult to obtain, and thus thorough research into materials to be used for the substrate is being conducted. In this regard, in lieu of the glass substrate, the use of a plastic substrate which is lighter than glass is being proposed.

However, the plastic substrate may suffer from thermal, chemical and mechanical damage in the course of forming an array pattern, forming a color filter, etc., undesirably deteriorating the image quality properties of the liquid crystal display device.

A typical example of a liquid crystal display device including a plastic substrate is schematically illustrated in FIG. 1A. Specifically, the liquid crystal display device may include upper and lower substrates 1 made of plastic, upper and lower electrodes 11 formed on the upper and lower substrates to apply driving voltage to the device and which are provided as transparent electrodes, barriers 140 having a two-layer structure and enabling the upper and lower substrates to be disposed at a predetermined distance, and a layer 150 of electrically charged particles or liquid crystals injected into cells defined by the barriers. Also, a polarizer may be formed on the outer surface of a plastic insulating substrate used as the upper substrate, and a reflective plate or a transmissive substrate may be formed on the outer surface of the lower substrate. Furthermore, the upper plastic insulating substrate may include a black matrix for defining unit pixels, and a color filter may be provided in the space enclosed by the black matrix. On the other hand, the lower substrate may include a switching element and a pixel electrode per unit pixel.

As another example of the flat panel display device, an organic electroluminescent (EL) device illustrates its cross-section in FIGS. 1B and 10, which includes a substrate 1 and a transparent electrode 110 or a reflective electrode 113 formed on the substrate 1.

Although the thickness and weight of the device are reduced thanks to the use of the plastic substrate, it is still very hard to suppress the deterioration of the image quality properties of a final product and integrate various functionalities so as to reduce the thickness and weight of the device.

Meanwhile, a reflective liquid crystal display device reflects external light to thus attain illumination, and thus includes a reflector for diffusing and reflecting external light. As such, the reflector is provided as an outward reflecting type in which a reflector is formed on the surface of a substrate opposite the surface having a liquid crystal layer, or as an inward reflecting type in which a reflector is formed on the surface of a substrate having a liquid crystal layer.

In accordance with the outward reflecting type, because the reflector is formed on the surface of the substrate opposite the surface having the liquid crystal layer, light incident from the outside is diffused and reflected by the reflector, and the reflected light is sequentially transmitted through the substrate and the liquid crystal layer and is then emitted at a display screen. As such, the reflected light may cause parallax attributable to the influence of the thickness of the substrate, resulting in a defocused image such as a double image or color-blending.

On the other hand, in accordance with the inward reflecting type, because the reflector is formed on the surface of the substrate having the liquid crystal layer, light incident from the outside is diffused and reflected by the reflector, and the reflected light is transmitted through the liquid crystal layer without passing through the substrate, and is then emitted at a display screen. In this case, because the reflector and the liquid crystal layer are disposed adjacent to each other and the reflected light is not affected by the thickness of the substrate, parallax does not occur, and thereby a defocused image is eliminated.

In the case where the substrate is a plastic substrate, namely, a film, the thickness thereof may become thinner than that of glass, and thus parallax may be reduced to that extent. However, in the case where a color filter is provided, one pixel is divided into three color dots each having one-third the size of the pixel. In this case, the reflected light may be transmitted through untargeted dots more easily than in a monochromic liquid crystal display device, and thus, the influence of the film thickness is not negligible.

Even in the case where the film is used as the substrate, particularly for a colored liquid crystal display device, the inward reflecting type should be adopted.

However, the liquid crystal display device of the inward reflecting type has a complicated configuration, thus making it difficult to manufacture. In particular, in the case where a film is used as the substrate, the film may easily expand and contract under the influence of heat or humidity, and so materials or process conditions thereof are restricted. Hence, methods of manufacturing the liquid crystal display device of the inward reflecting type using a film as the substrate are being sought, which are high yield and reduce the manufacturing cost depending on the design requirements.

In addition, in the fabrication of a reflective or transflective liquid crystal display device, a method of forming the reflector includes roughening the surface of a resin such as a resist layer through photolithography using a photomask, and forming a metal layer facilitating the reflection of light on the rough surface.

Other examples of the method of roughening the surface of the resin include a method of forming a rough surface using a resin having small particles dispersed therein (Japanese Unexamined Patent Publication No. Hei. 4-267220), a method of forming a rough surface through phase separation of two different types of resin upon curing (Japanese Unexamined Patent Publication No. Hei. 12-193807), and a method of forming a rough surface by controlling internal stress upon curing of a heat-photocurable resin material (Japanese Unexamined Patent Publication No. Hei. 12-171792).

However, the case where an electrode substrate of the liquid crystal display device of the inward reflecting type using a film as the substrate is manufactured by directly forming the reflector on the film has the following problems. Specifically, because the reflector needs a function of diffusing and reflecting external light, it has a rough surface. This roughness is obtained by roughening the surface of the liquid crystal layer and thus may adversely affect driving of the liquid crystals. So, sophisticated planarization technology is accordingly required, which may increase the manufacturing cost and reduce the yield. Also, the reflector formed of a metal layer may be damaged in the course of subsequent chemical treatment performed in forming the transparent electrode or the like. Furthermore, the film used as the substrate tends to expand or contract under the influence of heat or humidity, restricting the materials and manufacturing conditions for the reflector and the transparent electrode, and thus making it difficult to manufacture the liquid crystal display device depending on the design requirements. Moreover, in the manufacture of an electrode substrate for a transflective liquid crystal display device which is designed to use both a backlight and reflected external light as light sources, by means of directly forming a reflector or the like directly on a film, the problems as mentioned above may become more serious.

In the case where the reflector is formed as the inward reflecting type, a reflector composed of a metal layer is first formed on the entire upper surface of the plastic film. Then, a portion of the metal layer, corresponding to a pixel portion of a transparent electrode to be formed in a subsequent process, needs to be removed using high precision in order to allow the backlight to be transmitted therethrough. As such, the portion to be removed has an area smaller than the pixel portion of the transparent electrode.

Thereafter, ITO serving as the transparent electrode is formed in such a manner that the pixel portion of the transparent electrode overlaps the area in which the reflector composed of the metal layer is removed. A resist layer is formed on the ITO while aligning the resist layer and the ITO with good precision, and is then exposed and developed to thus remove the ITO, thus forming a pattern of the transparent electrode. This process requires a high degree of alignment precision.

However, a film made of plastic expands easily just by water washing, for example, and, conversely, the film contracts when being dried. In addition, such expansion or contraction is not immediately stabilized, and requires a long period of time to stabilize. For example, once the film is contracted, the dimension of the pattern formed on the film shows expansion for a long period of time, making it difficult to obtain reproducibility of the above-mentioned alignment.

Therefore, it is difficult to manufacture the transflective liquid crystal display device by forming the reflector or the transparent electrode directly on the film.

Also, the conventional method of manufacturing the reflector of the reflective (transflective) liquid crystal display device has the following problems.

In the method of creating roughness on the surface of the resin such as the resist layer using photolithography, simple repetition of the planar patterns on the reflector may cause the reflector to function as a diffraction grating. Accordingly, when the liquid crystal display screen is viewed, defects such as iridescence or so-called moire fringes may occur due to subtle errors in positioning relative to other repetitive patterns of wiring, black matrix or the like. For this reason, simple duplicative patterns such as pixel patterns cannot be used in designing the photomask for forming the rough patterns, and extremely vexatious and complicated designing is required. Thus, it is not easy to form reflectors having proper diffusing capacity by typical photolithography.

Also, the method disclosed in Japanese Unexamined Patent Publication No. Hei. 4-267220 disperses particles of a different resin material in the resin, and the method disclosed in Japanese Unexamined Patent Publication No. Hei. 12-193807 utilizes the phase separation of two different types of resin upon curing. Also, the method disclosed in Japanese Unexamined Patent Publication No. Hei. 12-171792 forms roughness by curing a portion of the surface of the resin and performing exposure or burning while leaving its interior uncured. In the case where the reflector is directly formed on a plastic film 50~200 μm thick using the aforementioned method, the warping of the plastic film may easily occur due to stress upon curing of the resin.

In addition, the reflector manufactured in accordance with any of the foregoing manufacturing methods has a composition of materials that are virtually different in refractive indices on opposing sides of a boundary such as an interface of the resin and the particles or an interface of separated phases. When the rough surface of the reflector is formed on the surface of the electrode substrate opposite the surface having the liquid crystal layer, incident light polarized by a polarizer is transmitted through the interface of the materials of the reflector having the different refractive indices via the liquid crystal layer, and then reflected by the metal layer.

In this case, the polarized incident light and the light dispersed by the metal layer may show depolarization due to refraction at the interface of the materials of the different refractive indices, whereby the degree of polarization of the light is reduced. Accordingly, in the case where the reflector disposed as above is applied to the liquid crystal display device, it is likely that the contrast ratio of the liquid crystal display screen will be reduced.

DISCLOSURE

Technical Problem

Therefore, the present invention intends to provide a plastic substrate, which increases electrical conductivity and functions per se as an assistant electrode.

The present invention also intends to provide a plastic substrate, which increases electrical conductivity and functions per se as an assistant electrode, and also which does not obstruct the transmission of light incident from the back surface thereof.

The present invention also intends to provide a plastic substrate, which includes a metal layer but does not crack upon bending.

The present invention also intends to provide a transparent electrode film, which has further improved electrical conductivity while protecting an electrode from the outside.

The present invention also intends to provide a plastic substrate in which a passivation layer or an electrode layer is formed on a metal layer by means of coating and curing an organic passivation layer containing a conductive material, thus preventing changes in dimension of the film at high temperature occurring upon deposition of ITO which is conventionally used as a transparent electrode.

The present invention also intends to provide an electronic paper display device or a liquid crystal display device having a clear image of a high contrast ratio based on high light transmittance using the plastic substrate as above.

The present invention also intends to provide an electronic paper display device, a liquid crystal display device or an organic EL device, including the above plastic substrate as a lower substrate to thus reduce the weight thereof.

Technical Solution

In an aspect of the present invention, there is provided a plastic substrate, comprising: a plastic film; a metal layer formed on the plastic film, wherein the conductive metal layer has a thickness ranging from 1 to 1000 nm; and a resin layer formed on the metal layer, wherein the resin layer has a thickness ranging from 10 nm to 25.5 μm.

In the aspect, the plastic film and resin layer may be a polyimide.

In the aspect, the plastic film and resin layer may be a polyimide having an average coefficient of linear thermal expansion (CTE) of 50.0 ppm/° C. or less when measured in a temperature range from 50° C. to 250° C. using a thermomechanical analyzer for a film thickness of 50~100 μm, with a yellowness index of 15 or less.

In the aspect, the plastic film and resin layer may be a polyimide having an average transmittance of 85% or more at 380~780 nm when measured using a UV spectrophotometer for a film thickness of 50~100 μm. Also, the passivation layer may be a polyimide layer having a transmittance of 88% or more at 550 nm and a transmittance of 70% or more at 420 nm when measured using a UV spectrophotometer for a film thickness of 50~100 μm.

In the aspect, the plastic film may be a polyimide film having color coordinates in which L is 90 or more, a is 5 or less and b is 5 or less when measured using a UV spectrophotometer for a film thickness of 50~100 μm.

In the aspect, the metal layer may be a monolayered or multilayered reflective metal layer selected from the group consisting of aluminum, titanium, silver, platinum, magnesium, tantalum, palladium, alloys thereof, indium tin oxide (ITO) and indium zinc oxide (IZO). The reflective metal layer may be selected from the group consisting of aluminum, magnesium and alloys thereof. Alternatively, the reflective metal layer may include a lower metal layer selected from the group consisting of aluminum, magnesium and alloys thereof; and an upper metal layer made of indium tin oxide or indium zinc oxide.

In the aspect, the reflective metal layer may have a thickness of 10~1,000 nm, and preferably 50~300 nm.

In the aspect, the metal layer may be a conductive metal layer selected from the group consisting of magnesium, barium, gold, aluminum, titanium, silver, platinum, tantalum, palladium, alloys and oxides thereof, indium tin oxide and indium zinc oxide.

In the aspect, the conductive metal layer may be indium tin oxide or indium zinc oxide.

In the aspect, specifically, the conductive metal layer may be selected from the group consisting of magnesium, barium, gold and oxides thereof. Alternatively, the conductive metal layer may include indium tin oxide.

In the aspect, the conductive metal layer may have a thickness of 1~300 nm.

The conductive metal layer may have a thickness of 1~100 nm, and preferably 1~50 nm.

In the aspect, the resin layer may comprise at least one layer selected from the group consisting of a resin layer having a conductive material dispersed therein and a passivation layer.

In the aspect, the resin layer having the conductive material dispersed therein may be formed from a polyimide varnish having a conductive material dispersed therein.

In the aspect, the conductive material may be carbon nanotubes or indium tin oxide powder.

As such, the indium tin oxide powder may contain 80~95 wt % of indium oxide and 5~20 wt % of tin oxide.

In the aspect, specifically, the resin layer having the conductive material dispersed therein may be formed from a polyimide varnish containing 0.001~1 part by weight of carbon nanotubes based on 100 parts by weight of a solid content of a polyimide resin.

In the aspect, specifically, the resin layer having the conductive material dispersed therein may be formed from a polyimide varnish containing 2~100 parts by weight of indium tin oxide powder based on 100 parts by weight of a solid content of a polyimide resin.

In the aspect, the resin layer having the conductive material dispersed therein may have a thickness ranging from 10 nm to 25 μm and the passivation layer is a polyimide layer having a thickness ranging from 10 nm to 500 nm. As such, if the resin layer includes both the resin layer having the conductive material dispersed therein and the passivation layer, the passivation layer may be formed between the metal layer and the resin layer having the conductive material dispersed therein.

The plastic substrate may further include a chemical resistance layer formed on at least one surface of the plastic film. The chemical resistance layer may include at least one selected from the group consisting of an acrylic resin, an epoxy-based resin, polysilazane and a polyimide-based resin.

Also, the plastic substrate may further include an inorganic layer formed on a lower surface of the plastic film or a lower surface of the metal layer.

As such, the inorganic layer may be provided in the form of a monolayer or multilayer structure using at least one inorganic material selected from the group consisting of SiNx, AlxOy, and SiOx.

Also, the plastic substrate may further include a metal oxide layer formed on an upper surface or a lower surface of the resin layer.

As such, the metal oxide layer may include silver oxide (Ago).

In the aspect, the plastic substrate may have a light transmittance of 50% or more at a wavelength of 500 nm, and also, a surface resistivity of $2.5 \times 10^6 \Omega/sq$ or less.

In another aspect of the present invention, there is provided a transparent electrode film, including a plastic film; a thin indium tin oxide or indium zinc oxide layer formed on the plastic film and having a predetermined pattern; and a resin layer formed on the thin indium tin oxide or indium zinc oxide layer.

The transparent electrode film may have a light transmittance of 50% or more at a wavelength of 500 nm.

The transparent electrode film may have a surface resistivity of 700 Ω/sq. or less.

In a further aspect of the present invention, there is provided a transmissive electronic paper display device, including the above plastic substrate as a lower substrate.

In still another aspect of the present invention, there is provided a display device, including the above plastic substrate as a lower substrate.

In yet another aspect of the present invention, there is provided an organic EL device, including the above plastic substrate as a lower substrate.

Advantageous Effects

According to an embodiment of the present invention, a plastic substrate has improved electrical conductivity, without obstructing the transmission of light, and does not have film cracking due to a metal layer.

According to another embodiment of the present invention, a plastic substrate includes a reflective metal layer of an inward reflecting type. If so, because light incident from outside a liquid crystal display device is diffused and reflected by a metal layer formed on a plastic film and the reflected light is not transmitted through the plastic film, parallax does not occur, thus obtaining a clear image which is not out of focus. Also, the metal layer can block not only external air or water vapor from the outside but also air or water vapor contained in the film itself, and thus there is no need to form a gas barrier layer on the surface of the plastic film having a liquid crystal layer, thereby further reducing the manufacturing cost and increasing the yield.

The plastic substrate according to the embodiments of the present invention is useful as a lower substrate of an electronic paper display device or a liquid crystal display device, thereby enabling the reduction of the weight of the display device.

DESCRIPTION OF DRAWINGS

FIGS. 3 to 10 are a cross-sectional view showing a plastic substrate according to various embodiments of the present invention, respectively;

BEST MODE

Hereinafter, a detailed description will be given of the present invention.

The present invention pertains to a plastic substrate for use in an electronic paper display device or a display device. According to an embodiment of the present invention, a plastic substrate is responsible for a transmission function and an electrode function in a transmissive electronic paper display device or a display device.

Figure 1A:
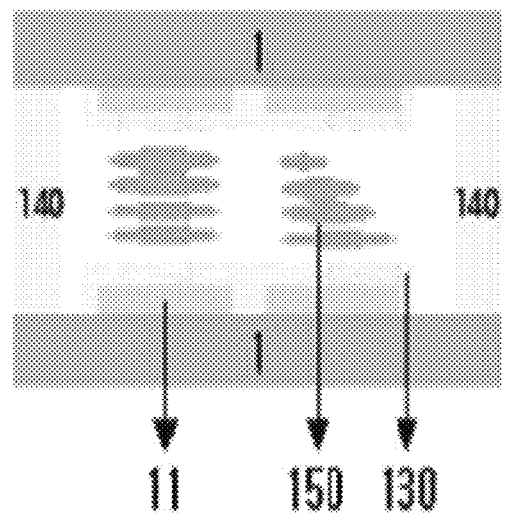
FIG. 1A is a cross-sectional view showing a liquid crystal display device as a flat panel display device.
Figure 1B:
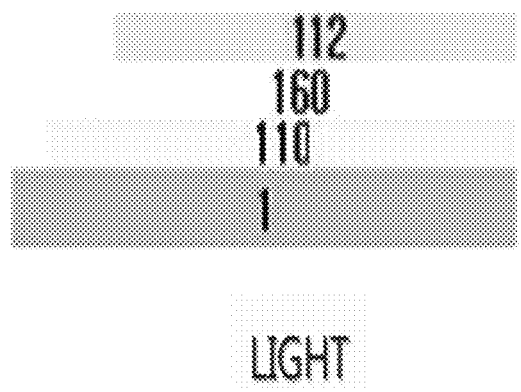
FIGS. 1B and 10 are a cross-sectional view showing an organic EL device as a flat panel display device, respectively.
Figure 1C:
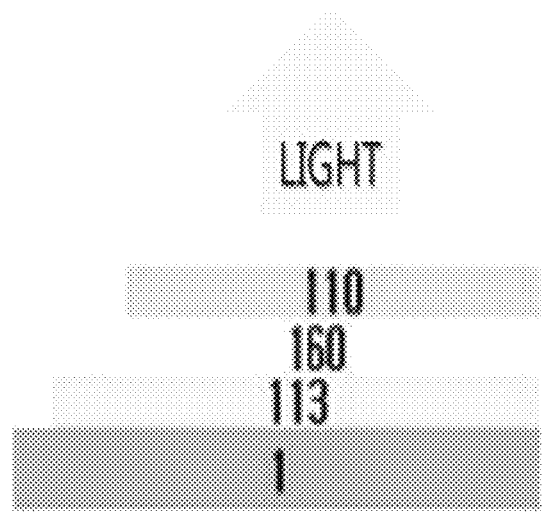
Figure 2:
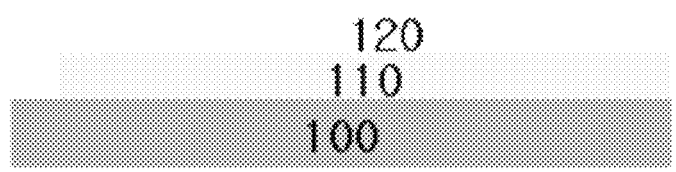
FIG. 2 is a cross-sectional view showing a plastic substrate according to an embodiment of the present invention.

The plastic substrate according to the embodiment of the present invention is illustrated in FIG. 2. As illustrated in FIG. 2, the plastic substrate includes a plastic film 100, a metal layer 110 disposed on the plastic film and having a conductive function, and a resin layer 120 formed on the surface of the metal layer and having a conductive material dispersed therein. Also, in the case of a plastic substrate according to another embodiment of the present invention which will be described later, the metal layer 110 having a conductive function may be a reflective metal layer or a conductive reflective metal layer.

In a subsequent process such as directly depositing the metal layer on the plastic film 100 or arraying a thin film transistor on the film, the film may expand or contract under the influence of heat or humidity. Accordingly, conditions for the subsequent process may be restricted, mis-alignment with the subsequent layer or member may occur, or planarization of the film may not be maintained, thus generating a warping phenomenon. So, the plastic film 100 of the plastic substrate may have a glass transition temperature of 250° C. or higher and as low a coefficient of linear thermal expansion (CTE) as possible. Specifically, the plastic film may be a high heat-resistant film having an average CTE of 50.0 ppm/° C. or less and preferably 35.0 ppm/° C. or less when measured within a temperature range of 50~250° C. using a thermomechanical analyzer for a film thickness of 50~100 µm. An example thereof may include but is not limited to a polyimide film.

In terms of transmittance, a colorless transparent plastic film, in particular, a polyimide film having a yellowness index of 15 or less for the film thickness of 50~100 µm may be used. Also, as the plastic film, useful is a polyimide film having an average transmittance of 85% or more at 380~780 nm when measured using a UV spectrophotometer for the film thickness of 50~100 µm. In the case where the plastic film satisfies the transmittance as above, it may be utilized as a plastic substrate for a transmissive electronic paper or liquid crystal display device. Furthermore, the plastic film may be a polyimide film having a transmittance of 88% or more at 550 nm and a transmittance of 70% or more at 420 nm when measured using a UV spectrophotometer for the film thickness of 50~100 µm.

Also, in terms of increasing transparency to thus raise transmittance, the polyimide film may be a polyimide film having color coordinates, in which L is 90 or more, a is or less and b is 5 or less, when measured using a UV spectrophotometer for the film thickness of 50~100 µm.

The polyimide film may be obtained by polymerizing aromatic dianhydride and diamine, thus obtaining polyamic acid, which is then imidized. An example of the aromatic dianhydride may include, but is not limited to, one or more selected from the group consisting of 2,2-bis(3,4-dicarboxyphenyl)hexafluoropropane dianhydride (6-FDA), 4-(2,5-dioxotetrahydrofuran-3-yl)-1,2,3,4-tetrahydronaphthalene-1, 2-dicarboxylic anhydride (TDA), 4,4'-(4,4'-isopropylidenediphenoxy)bis(phthalic anhydride) (HBDA), pyromellitic dianhydride (PMDA), biphenyltetracarboxylic dianhydride (BPDA), and oxydiphthalic dianhydride (ODPA).

An example of the aromatic diamine may include, but is not limited to, one or more selected from the group consisting of 2,2-bis[4-(4-aminophenoxy)-phenyl]propane (6HMDA), 2,2'-bis(trifluoromethyl)-4,4'-diaminobiphenyl (2,2'-TFDB), 3,3'-bis(trifluoromethyl)-4,4'-diaminobiphenyl (3,3'-TFDB), 4,4'-bis(3-aminophenoxy)diphenylsulfone (DBSDA), bis(3-aminophenyl)sulfone (3DDS), bis(4-aminophenyl)sulfone (ODDS), 1,3-bis(3-aminophenoxy)benzene (APB-133), 1,4-bis(4-aminophenoxy)benzene (APB-134), 2,2'-bis[3(3-aminophenoxy)phenyl]hexafluoropropane (3-BDAF), 2,2'-bis[4(4-aminophenoxy)phenyl]hexafluoropropane (4-BDAF), 2,2'-bis(3- aminophenyl)hexafluoropropane (3,3'-6F), 2,2'-bis(4-aminophenyl)hexafluoropropane (4,4'-6F) and oxydianiline (ODA).

The method of manufacturing the polyimide film using the monomers as above is not particularly limited, and for example includes polymerizing an aromatic diamine and an aromatic dianhydride in the presence of a first solvent thus obtaining a polyamic acid solution, imidizing the polyamic acid solution, adding the imidized solution to a second solvent, performing filtration and drying thus obtaining a solid polyimide resin, dissolving the solid polyimide resin in the first solvent thus preparing a polyimide solution, which is then subjected to a film forming process, thereby obtaining the polyimide film. As such, the second solvent may have polarity lower than that of the first solvent. Specifically, the first solvent may be one or more selected from the group consisting of m-cresol, N-methyl-2-pyrrolidone (NMP), dimethylformamide (DMF), dimethylacetamide (DMAc), dimethylsulfoxide (DMSO), acetone and diethylacetate, and the second solvent may be one or more selected from the group consisting of water, alcohols, ethers and ketones.

In the formation of the metal layer on the plastic film, in order to form the metal layer having a uniform thickness, the plastic film may have a surface roughness of 2 µm or less, and preferably 0.001~0.04 µm.

On such a plastic film, the metal layer 110 having conductivity (hereinafter, referred to as conductive metal layer) may be formed to a thickness of 1~300 nm in consideration of transmittance. In this case, the deterioration of optical properties including transmittance may be suppressed. In particular, when the thickness of the conductive metal layer is 1~100 nm, the CTE of the plastic film substrate may be advantageously reduced, without the deterioration of the optical properties including transmittance due to the metal layer. If the thickness of the conductive metal layer exceeds the above upper limit, conductivity may be increased but the plastic film may crack upon bending.

Examples of a material used for the conductive metal layer include, but are not limited to, magnesium, barium, gold, aluminum, titanium, silver, platinum, tantalum, palladium, alloys or oxides thereof, indium tin oxide (ITO), and indium zinc oxide (IZO). When a metal or metal alloy is used, the effect of the thickness of a metal layer on transmittance may be greater than when using metal oxide. Thus, in the case of using the metal or metal alloy, the thickness of the metal layer may be set to 1~50 nm.

In the case where such a conductive metal layer is included, it may increase electrical conductivity without obstructing the transmission of light and may further function as an electrode. From the point of this view, the conductive metal layer may be a thin ITO or IZO layer.

Such a conductive metal layer is advantageous in terms of electrical conductivity, and also, may exhibit gas and/or water vapor barrier properties to thus suppress the deformation of the plastic film due to gas or water vapor.

Examples of the method of forming the conductive metal layer on the plastic film may include but are not limited to sputtering, ion plating, electroplating, and chemical vapor deposition (CVD).

According to the embodiment of the present invention, the plastic film is exemplified by the high heat-resistant film, and thus, the process conditions for the formation of the conductive metal layer are barely restricted, compared to a conventional plastic substrate.

The plastic substrate according to the embodiment of the present invention may include the resin layer 120 formed on the conductive metal layer 110 and having a conductive material, for example, carbon nanotubes (CNTs) or ITO powder, dispersed therein. The resin layer having CNTs or ITO powder dispersed therein may further increase conductivity and may also function as an additional electrode layer. The resin layer having CNTs or ITO powder dispersed therein may be obtained by applying a transparent varnish containing CNTs or ITO powder, or by dispersing CNTs or ITO powder in a transparent polyimide varnish and then applying the varnish.

As such, in terms of surface resistivity and light transmittance of an electrode film for a display, the CNTs of the polyimide varnish may be used in an amount of 0.001~1 part by weight based on 100 parts by weight of the solid content of the resin of the varnish.

The kinds of CNTs are not limited, but may include single-walled CNTs, double-walled CNTs, multi-walled CNTs, and modified CNTs in which the surface of CNTS is modified through chemical or physical treatment.

The method of dispersing the CNTs in the varnish is not particularly limited, but includes for example physical dispersion using ultrasonic waves, a three roll-mill, a homogenizer, a kneader, a mill blender or a ball mill, or chemical dispersion using chemical bonding between the varnish and the monomer through chemical treatment. As such, the addition of CNTs may be performed in-situ upon polymerization of the varnish, or may be carried out through blending after polymerization of the varnish. For appropriate dispersion of the CNTs, an additive such as a dispersant or an emulsifier may be used.

Examples of the method of forming the resin layer having the CNTs dispersed therein may include but are not limited to spin coating, casting using a doctor blade, etc.

In particular, because the CNTs may increase conductivity without obstructing the transmission of light passed through the thin metal layer thanks to their specific structure, the resin layer having the CNTs dispersed therein may be formed on the metal layer.

In the case where the ITO powder is used along with or instead of the CNTs, its amount may be set to 2~100 parts by weight based on 100 parts by weight of the solid content of the resin of the varnish.

In the case where the ITO powder is added, the electrical properties may be controlled depending on the amount of ITO, and may also be controlled by adjusting the amounts of indium oxide and tin oxide in ITO itself. As such, ITO may contain 80~95 wt % of indium oxide ($In_2O_3$) and 5~20 wt % of tin oxide ($S_2O_n$, Also, ITO may be provided in the form of powder, and the size thereof may vary depending on the kind of material used and the reaction conditions. The ITO powder may have an average minimum diameter of 30~70 nm, and an average maximum diameter of 60~120 nm.

The method of preparing the varnish containing ITO is not particularly limited, but may include dispersing ITO in the polyamic acid solution such that the amount of ITO is 2~100 parts by weight based on 100 parts by weight of the solid content of polyamic acid in order to exhibit conductivity or maintain the flexibility of the film.

The method of adding the ITO to the polyamic acid solution is not particularly limited, but may include for example adding ITO to the polyamic acid solution before or during polymerization, kneading ITO after completion of polymerization of polyamic acid, or mixing a dispersion solution containing ITO with the polyamic acid solution. As such, because dispersibility of ITO is affected by the viscosity and acidity-basicity of the dispersion solution and has an influence on conductivity and uniformity of visible light transmittance, the dispersion process should be sufficiently performed. To this end, the dispersion process may be performed using a three roll-mill, a sonicator, a homogenizer or a ball mill.

In the formation of the resin layer having the CNTs or ITO powder dispersed therein in this way, its thickness may be set to the range from 10 nm to 25 µm in terms of suppressing the deterioration of optical properties of the display including transmittance.

When the substrate is formed of plastic as above, it may play a role as a transmissive substrate and a transparent electrode substrate, so that a liquid crystal display device may become lighter in weight.

Figure 3:
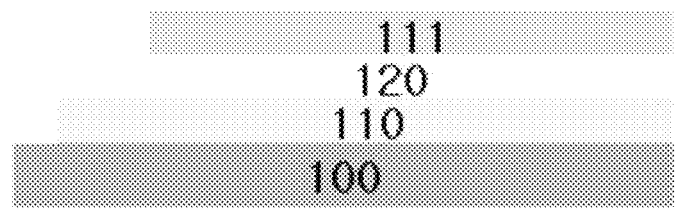
Figure 4:
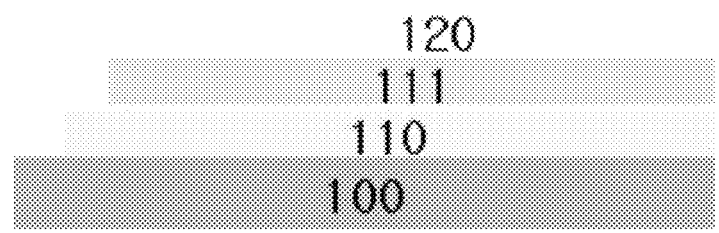

According to another embodiment of the present invention, a plastic substrate may include a metal oxide layer formed on the upper surface or the lower surface of the resin layer 120 having the conductive material dispersed therein. The oxide layer may increase transmittance and may function as a barrier layer for blocking gas and water vapor. The oxide layer is specifically exemplified by a silver oxide (AgO) layer, and is illustrated in FIGS. 3 and 4. FIG. 3 illustrates the oxide layer 111 formed on the upper surface of the resin layer 120 having the conductive material dispersed therein in the plastic substrate, and FIG. 4 illustrates the oxide layer 111 formed on the lower surface of the resin layer 120 having the conductive material dispersed therein in the plastic substrate.

In the case where the oxide layer 111 is formed, the thickness thereof is not particularly limited but may be set to about 10~300 nm in terms of adhesiveness to the resin layer, thickness uniformity of the oxide layer, and prevention of cracking of the substrate upon bending.

According to a further embodiment of the present invention, a plastic substrate may further include a layer for preventing the permeation of a solvent into the substrate and electrode. In the present invention, this layer is referred to as a chemical resistance layer.

Figure 5:
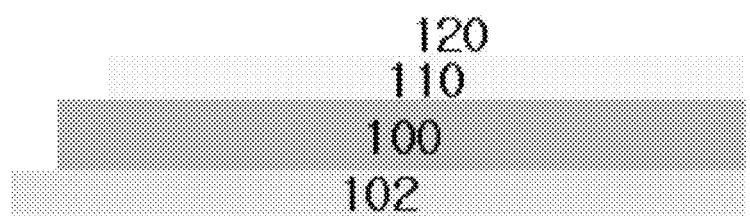
Figure 6:
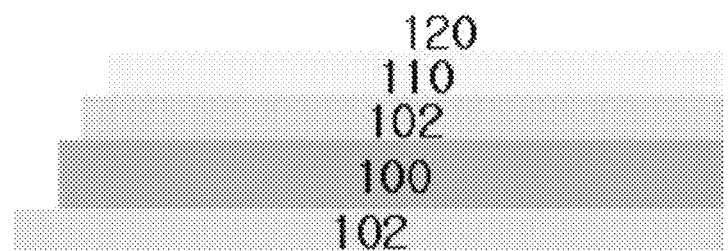
Figure 7:
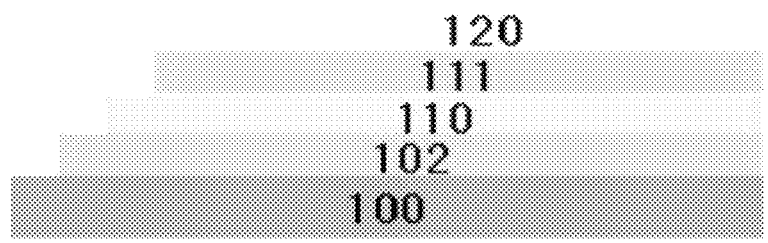
Figure 8:
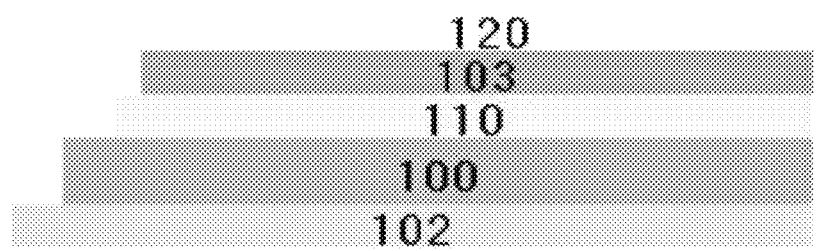

Examples of the plastic substrate having the chemical resistance layer are illustrated in FIGS. 5 to 8. FIGS. 5 and 8 illustrate the chemical resistance layer 102 formed on the lower surface of the plastic film 100, FIG. 6 illustrates the chemical resistance layer 102 formed on the upper and lower surfaces of the plastic film 100, and FIG. 7 illustrates the chemical resistance layer 102 formed only on the upper surface of the plastic film 100.

The composition of the chemical resistance layer 102 is not particularly limited, so long as it does not decrease transparency, is insoluble in an organic solvent and a solvent for washing in a display manufacturing process, and exhibits good adhesiveness to the substrate film. Specifically, the chemical resistance layer 102 may be a layer containing at least one resin selected from the group consisting of an acrylate-based resin, an epoxy-based resin, polysilazane and a polyimide-based resin.

When the chemical resistance layer 102 is formed on the lower surface of the plastic film 100, solvent permeation into the plastic film from the outside may be prevented. When the chemical resistance layer 102 is formed on the upper surface of the plastic film 100, it may aid the formation of the conductive metal layer 110 on the plastic film 100, in addition to the prevention of solvent permeation.

The method of forming the chemical resistance layer 102 is not particularly limited, but may include for example spin coating, casting, roll-to-roll coating, impregnation, etc.

The thickness of the chemical resistance layer 102 is not limited, but may be set to about 10~500 nm in terms of achieving thickness uniformity and suppressing the deterioration of optical properties including transmittance.

According to still a further embodiment of the present invention, a plastic substrate may further include a passivation layer (a planarization layer) formed on the metal layer, and is illustrated in FIG. 8. The passivation layer 103 functions to protect the reflective metal layer and planarize the surface of the reflective metal layer, and is also favorable in terms of facilitating the subsequent formation of the resin layer 120 having the conductive material dispersed therein and preventing the warping of the plastic substrate. From the point of these views, the passivation layer may be imparted with insulating properties without obstructing the transmission of light reflected by the reflective metal layer.

Accordingly, the passivation layer may be formed with a polyimide resin which is the same as in the polyimide film used as the plastic film. For example, the passivation layer may be a colorless transparent resin layer having a visible light transmittance of 85% or more.

The thickness of the passivation layer 103 is set to be adapted to planarize an uneven surface due to the reflective metal layer 110. The thickness of the passivation layer 103 is not limited, but may be about 10~500 nm in consideration of the force of adhesion to the metal layer and ease of deposition of an organic light-emitting layer 160.

According to still another embodiment of the present invention, a plastic substrate may further include an inorganic layer. The plastic substrate may consist of a plastic film 100. Because the film itself contains air or water vapor and has high air or water vapor permeability, air or water vapor resulting from the outside or the film itself may infiltrate the liquid crystal layer or the organic light-emitting layer thus generating foam, or the liquid crystal layer or the organic light-emitting layer may be oxidized by water vapor and oxygen, undesirably reducing the lifespan of the display device and deteriorating the properties thereof. So, the inorganic layer may be provided in the form of a monolayer or multilayer structure on the inner or outer surface of the plastic substrate, and may thus be used as a barrier layer for blocking the gas and water vapor. Such a layer may block not only external air or water vapor from the outside but also air or water vapor contained in the film itself.

Figure 9:
Figure 10:
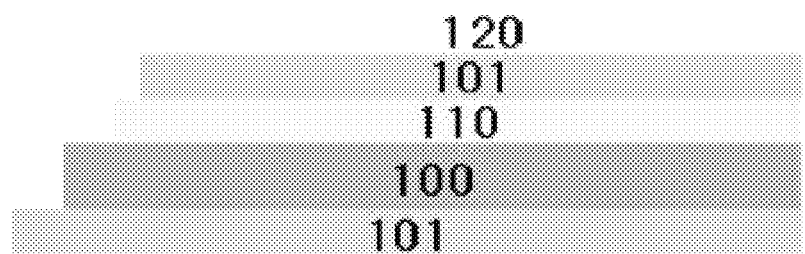

Such an inorganic layer is illustrated in FIGS. 9 and 10.

FIG. 9 illustrates the inorganic layer 101 formed on the lower surface of the plastic film 100, and FIG. 10 illustrates the inorganic layer 101 formed on the lower surface of the plastic film 100 and the lower surface of the resin layer 120 having the conductive material dispersed therein.

Although the barrier layer for blocking water vapor and gas may be realized using the conductive metal layer 110 or the oxide layer 111 even in the absence of the inorganic layer, in order to impart more sufficient water vapor and gas barrier properties, the inorganic layer 101 may be additionally provided.

The inorganic layer 101 may be formed using an oxide such as SiOx, SiNx or AlxOy, and the formation method thereof is not limited but may include inorganic deposition techniques typically known in the art, such as low-temperature film formation, high-temperature film formation or plasma-enhanced CVD. The thickness of the inorganic layer 101 is not limited but may be set to about 10~300 nm, in terms of reducing gas and water vapor transmission rates to prevent oxidation of the organic layer or the liquid crystal layer and the metal layer and facilitating the deposition of the organic light-emitting layer. Alternatively, the inorganic layer may be provided in the form of a multilayer structure of two to four layers along with the planarization layer.

The plastic substrate according to the embodiments of the present invention is useful as a substrate of an electronic paper display device or a display device. In the case where the above plastic substrate is used as a lower substrate of the display device, it may increase electrical conductivity without obstructing the transmission of light incident from the back surface thereof, thus aiding realizing a bright image.

In the case of the plastic substrate having the conductive metal layer, in order to use the conductive metal layer as an electrode, the conductive metal layer is deposited to be thick on the plastic film. Thereby, upon bending of the plastic substrate, the metal layer may be stripped and may crack attributable to the difference in flexibility between the plastic substrate and the metal layer, and may thus lose the ability to function as an electrode. However, in the case of the plastic substrate according to the embodiment of the present invention, in addition to the conductive metal layer, the resin layer having the conductive material dispersed therein is also formed, and thus the conductive metal layer may be formed to be thinner. Moreover, problems related to stripping and cracking of the conductive metal layer based on the difference in dimensional stability occurring upon bending of the plastic substrate may be alleviated thanks to the resin of the resin layer and the plastic film formed on upper and lower surfaces of the conductive metal layer, thereby increasing stripping resistance and cracking resistance upon bending of the display and of the substrate, compared to a monolayered electrode structure of a conventional conductive metal layer.

The plastic substrate according to the embodiment of the present invention may have a surface resistivity of $2.5 \times 10^6 \Omega$/sq. or less and a light transmittance of 50% or more at a wavelength of 500 nm, so as to be adapted for a display device.

Figure 11:
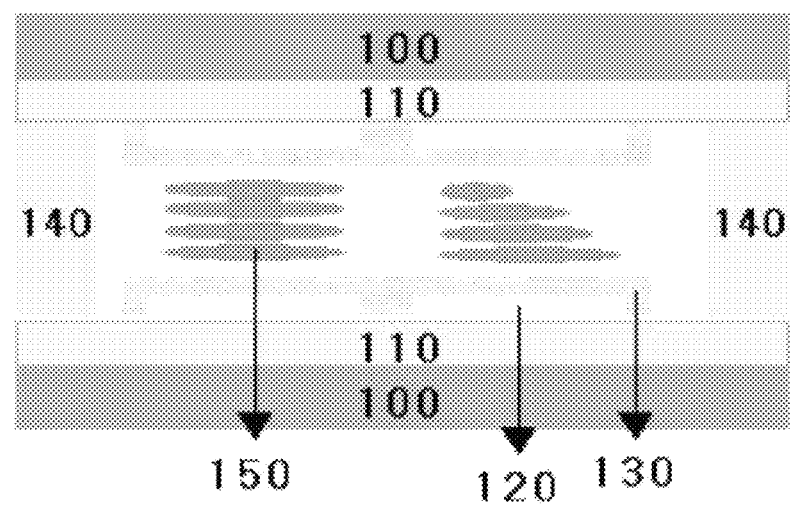
FIG. 11 is a cross-sectional view showing a liquid crystal display device including the plastic substrate according to the embodiment of the present invention.
Figure 12A:
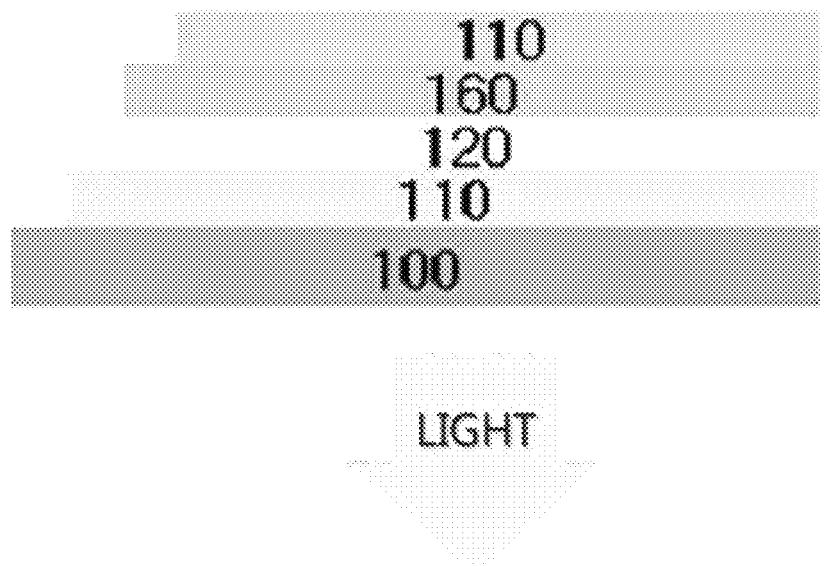
FIGS. 12A and 12B are a cross-sectional view showing an organic EL device including the plastic substrate according to the embodiment of the present invention, respectively.
Figure 12B:
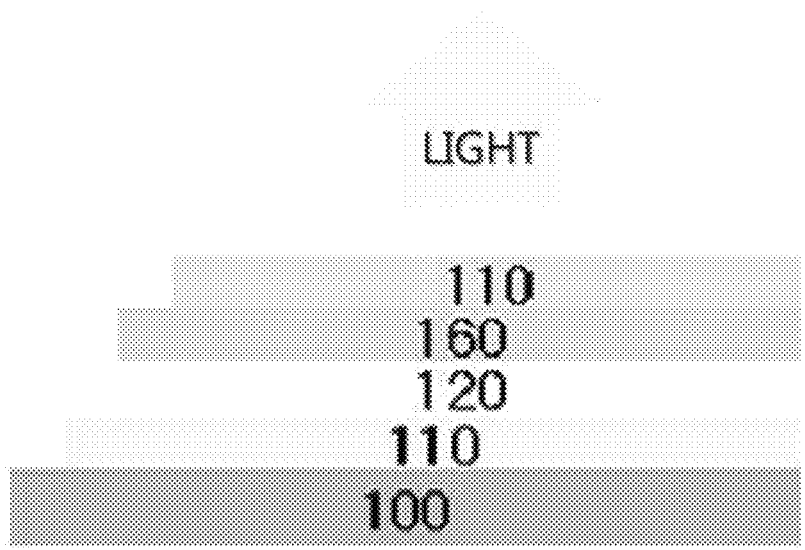
Figure 13:
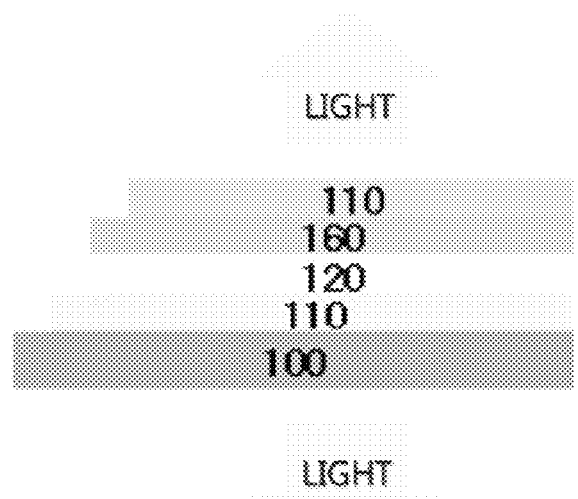
FIG. 13 is a cross-sectional view showing a transmissive organic EL device including the plastic substrate according to the embodiment of the present invention.

Examples of the flat panel display device using the plastic substrate according to the embodiment of the present invention may include but are not limited to a liquid crystal display device using the above plastic substrate as a lower substrate as illustrated in FIG. 11, and an organic EL device using the above plastic substrate as a substrate as illustrated in FIGS. 12A, 12B and 13. In particular, FIG. 13 depicts a transmissive organic EL device.

In addition, the plastic substrate according to the present invention may be utilized as a transparent electrode film. In this case, the conductive metal layer may be a thin ITO or IZO layer.

In the fabrication of the organic EL device, an electrode layer may be formed with the conductive metal layer containing Ag, Mg, Ba or Ca, so that a transparent electrode containing Ag may be used as an anode and a transparent electrode containing Ca or Mg may be used as a cathode.

The transparent electrodes have cross-sections similar to each other, with the exception that the conductive metal layer 110 of the plastic substrate of FIG. 2 is stripe-shaped through photolithography and etching and the resin layer 120 having the conductive material dispersed therein is formed on the stripe-shaped conductive metal layer 110, and thus examples of the transparent electrodes are not particularly shown.

Manufacturing the transparent electrode film entails forming the conductive metal layer 110 on the plastic film and then patterning the conductive metal layer 110 through photolithography and etching, thus forming the stripe-shaped metal layer. The stripe-shaped metal layer thus formed may function as a transparent electrode. The resin layer having the conductive material dispersed therein is formed on the metal electrode 112 through the above method. Subsequently, heating and curing are performed, thereby obtaining the transparent electrode film.

The transparent electrode film thus obtained may increase electrical conductivity without obstructing the transmission of incident light, thus allowing a bright image to be realized. In particular, the transparent electrode film can exhibit higher light transmittance thus realizing a brighter image, compared to an electrode film composed exclusively of CNTs.

The transparent electrode film according to the embodiment of the present invention may have a surface resistivity of 700 $\Omega$/sq. or less and a light transmittance of 50% or more at a wavelength of 500 nm, so as to be adapted as an electrode.

The plastic substrate according to another embodiment of the present invention may be configured as in FIG. 2, with the exception that the conductive metal layer is replaced with a reflective metal layer 110.

Taking into consideration reflectivity, the metal layer may be formed to be thick, and the thickness thereof may be set to about 10~1000 nm.

In the case where transmittance is to be increased compared to reflectivity, for example, where the metal layer is applied to a transmissive electronic paper or liquid crystal display device, the metal layer may be formed to be thin, and the thickness thereof may be set to about 50~300 nm so as to prevent the deterioration of optical properties including transmittance due to the metal layer and reduce the CTE due to the metal layer deposited on the surface of the plastic film substrate.

If the metal layer is too thick, reflectivity or conductivity may be increased but cracking may be caused upon bending of the plastic film.

The metal layer may be selected from the group consisting of using aluminum, titanium, silver, platinum, magnesium, tantalum, palladium and alloys thereof, or may be made of ITO or IZO.

In the case where such a reflective metal layer is included, the reflective metal layer may increase electrical conductivity without obstructing the transmission of light and may further function as an electrode. In particular, to realize these effects, the reflective metal layer may be configured such that a thin ITO or IZO layer is formed on a reflective metal layer made of aluminum or its alloy, or magnesium or its alloy.

Such a reflective metal layer is favorable in terms of electrical conductivity, and may also exhibit gas and/or water vapor barrier properties to thus suppress the deformation of the plastic film due to gas or water vapor.

Examples of the method of forming the reflective metal layer on the plastic film may include but are not limited to sputtering, ion plating, electroplating and CVD.

According to the embodiment of the present invention, the high heat-resistant film may be used as the plastic film, and thus the process conditions for the formation of the reflective metal layer are barely restricted, compared to a conventional plastic substrate.

In the case where the reflective metal layer is formed on the plastic film in this way, when it is applied as an inward reflecting type, light incident from outside the liquid crystal display device is diffused and reflected by the metal layer formed on the plastic film, and the light thus reflected does not pass through the plastic film, and thus parallax does not occur, consequently producing a clear image which is not out of focus.

Examples of the method of forming the metal layer on the plastic film may include but are not limited to sputtering, ion plating, electroplating and CVD, as mentioned above.

It goes without saying that the plastic substrate according to the embodiment of the present invention including the reflective metal layer may further include the metal oxide layer, the chemical resistance layer or the inorganic layer as described above.

The plastic substrate according to the embodiment of the present invention including the reflective metal layer is useful as a substrate of an electronic paper display device or a flat panel display device. In the case of a transmissive display device, when the plastic substrate without a reflective metal layer is used as a lower substrate, it may increase electrical conductivity without obstructing the transmission of light incident from the back surface thereof, thereby producing a bright image.

Because the substrate made of plastic may function as a reflective plate or a transparent electrode substrate, the liquid crystal display device may become lighter in weight.

The plastic substrate according to the embodiment of the present invention including the reflective metal layer is useful as a lower substrate of a reflective electronic paper or liquid crystal display device for reflecting external light without an internal light source and thus producing an image.

If the metal layer is patterned, it may be applied to a lower substrate of a transflective electronic paper or liquid crystal display device. For example, the metal layer, serving as a reflector, is formed to remain around the periphery of the pixel portion of the transparent electrode, and the metal is removed in the center of the pixel portion in an aligned manner such that the area from which the metal was removed is smaller than the area of the pixel portion, for example, about 10~20% of the area of the pixel portion.

The plastic substrate may be employed in the transflective liquid crystal display device, with the addition of such a patterning process. Specifically, when a backlight is used as a light source, light is transmitted through the area of the reflector where the metal layer has been removed (window), corresponding to the pixel portion, whereby an image can be displayed. Moreover, when external light is used as the light source, the external light is reflected by the area of the reflector where the metal layer is present, corresponding to the pixel portion, whereby an image can be displayed.

In the case of the plastic substrate having the reflective metal layer, in order to use the reflective metal layer as an electrode, the reflective metal layer is deposited to be thick on the plastic film. Thereby, upon bending of the plastic substrate, the metal layer may be stripped and may crack due to the difference in flexibility between the plastic substrate and the metal layer, thus losing the ability to function as an electrode. However, in the case of the plastic substrate according to the embodiment of the present invention, in addition to the reflective metal layer, the resin layer having the conductive material dispersed therein is also formed, and thus the reflective metal layer may be formed to be thinner. Furthermore, problems related to stripping and cracking of the reflective metal layer based on the difference in dimensional stability occurring upon bending of the plastic substrate may be alleviated thanks to the resin of the resin layer and the plastic film formed on upper and lower surfaces of the reflective metal layer, thereby increasing stripping resistance and cracking resistance upon bending of the display and of the substrate, compared to a monolayered electrode structure of a conventional reflective metal layer.

The method of manufacturing the plastic substrate including the plastic film, the metal layer, the resin layer (the passivation layer and/or the transparent electrode layer) is not particularly limited but may include for example preparing a polyimide precursor solution for the plastic film; subjecting part of the precursor of the precursor solution to ring closure, condensation and crosslinking or polymerization to thereby prepare a solution containing a partially cured intermediate; preparing a coating solution based on the solution containing a partially cured intermediate; applying the coating solution on a target; heating the coating solution to completely cure it, thus obtaining the plastic film; forming a passivation layer (a planarization layer) to planarize the surface of the metal layer using the above resin; and forming the resin layer containing the conductive material on the surface of the metal layer, thus acting as the transparent electrode layer.

MODE FOR INVENTION

A better understanding of the present invention may be obtained through the following examples and comparative examples which are set forth to illustrate, but are not to be construed as limiting the present invention.

Preparation of Plastic Film

Preparative Example 1

2,2'-bis(trifluoromethyl)-4,4'-diaminobiphenyl (2,2'-TFDB), biphenyltetracarboxylic dianhydride (BPDA) and 2,2-bis(3,4-dicarboxyphenyl)hexafluoropropane dianhydride (6-FDA) were condensed through a known process in the presence of dimethylacetamide, thereby obtaining a polyimide precursor solution (solid content of 20%). This reaction procedure is represented by Reaction 1 below.

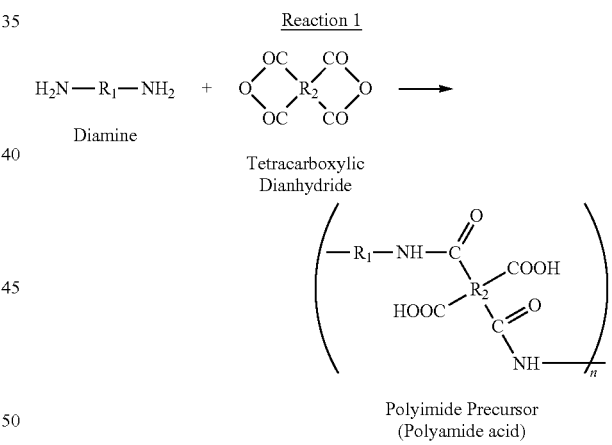

Thereafter, according to the process known above, 300 g of the polyimide precursor solution was added with 2~4 equivalents of each of acetic anhydride (acetic oxide, available from SamChun) and pyridine (available from SamChun) as chemical curing agents, thus preparing a polyamic acid solution, which was then heated at a heating rate of 1~10° C./min within a temperature range of 20~180° C. for 2~10 hours, thus partially imidizing the polyamic acid solution to cure it, thereby preparing a solution containing a partially imidized (partially cured) intermediate.

Reaction 2 below represents the preparation of a polyimide film by heating the precursor of polyimide. In an embodiment of the present invention, polyimide is obtained not by imidizing the entire precursor solution but by imidizing a predetermined portion of the precursor.

Reaction 2

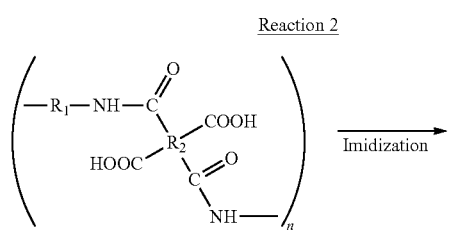

Polyimide Precursor
(Polyamide acid)
[Form A]

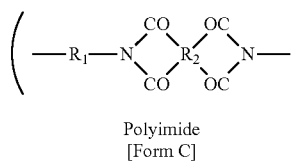

Polyimide
[Form C]

Specifically, the polyimide precursor solution is heated and stirred under predetermined conditions, thus generating dehydration and ring closure between the hydrogen atom of the amide group of the polyimide precursor and the carboxylic group. As represented by Formula 1 below, form B of the intermediate and form C of the imide are produced as shown in Reaction 2. Also, in the molecular chain, form A (polyimide precursor) in which dehydration does not completely occur exists.

In the molecular chain in which the polyimide precursor is partially imidized, as represented by Formula 1, form A (polyimide precursor), form B (intermediate), and form C (imide) are mixed.

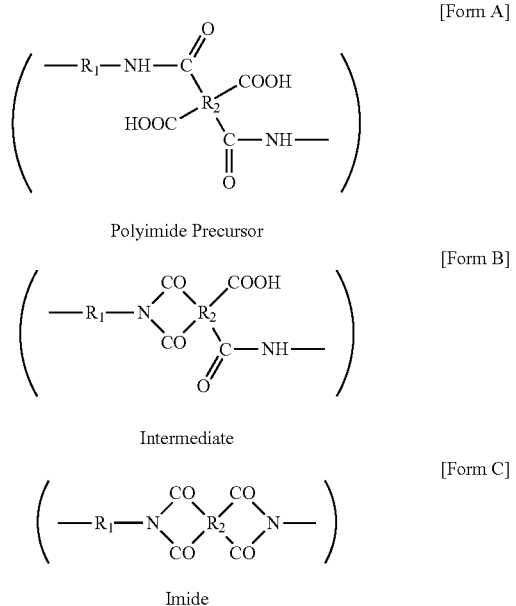

[Form A]

Polyimide Precursor

[Form B]

Intermediate

[Form C]

Imide 30 g of the imidized solution having the above mixed structure was added to 300 g of water to precipitate it, and the precipitated solid was filtered and milled thus obtaining powder, which was then dried in a vacuum oven at 80~100° C. for 2~6 hours, thus obtaining about 8 g of solid resin powder. Through the above procedure, the polyimide precursor of form A was converted into form B or form C. The solid resin was dissolved in 32 g of a polymerization solvent such as DMAc or DMF, thus obtaining a 20 wt % polyimide solution. The polyimide solution was heated at a heating rate of 1~10° C./min within a temperature range of 40~400° C. for 2~8 hours, resulting in polyimide films having a thickness of 50 μm and 100 μm.

The state in which the polyimide precursor is partially imidized is represented by Reaction 3 below.

Reaction 3

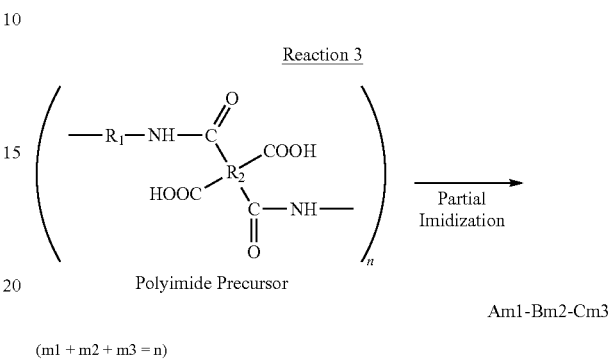

Polyimide Precursor

Am1-Bm2-Cm3

(m1 + m2 + m3 = n)

For example, under the above conditions, about 45~50% of the precursor is imidized and cured. An imidization rate in which part of the precursor is imidized may be easily controlled depending on changes in heating temperature or time, and may be set to about 30~90%.

In the process of imidizing part of the polyimide precursor, water is generated when the polyimide precursor is imidized through dehydration and ring closure. This water may cause hydrolysis of amide of the polyimide precursor or breakage of the molecular chain, undesirably reducing stability. Upon heating of the polyimide precursor solution, water may be removed through addition of an azeotropic reaction using toluene or xylene or through volatilization of a dehydrating agent.

Thereafter, a process of preparing a coating solution is described below. The partially cured intermediate was added to the solvent used in the preparation of the polyimide precursor at a ratio of 100 parts by weight of the solution and 20~30 parts by weight of the polyimide precursor, thus preparing a uniform coating solution.

Thereafter, the above resin solution was applied on a substrate for film formation such as glass or SUS through spin coating or casting using a doctor blade and then dried at high temperature as mentioned above, thus forming a film 50 μm thick. The film thus formed was not subjected to a process of stretching any one surface of the film in isolation on the basis of the vertical/horizontal axis, and thus had the same refractive index for the entire surface thereof.

Preparative Example 2

While nitrogen was passed through a 100 ml three-neck round bottom flask reactor equipped with a stirrer, a nitrogen inlet, a dropping funnel, a temperature controller and a condenser, 34.1904 g of N,N-dimethylacetamide (DMAc) was placed in the reactor, the temperature of the reactor was decreased to 0° C., 4.1051 g (0.01 mol) of 6-HMDA was dissolved therein, and then this solution was maintained at 0° C. Further, 4.4425 g (0.01 mol) of 6-FDA was added thereto and stirred for 1 hour, thus completely dissolving the 6-FDA. The solid content was thus 20 wt %. The solution was then stirred at room temperature for 8 hours, thus obtaining a polyamic acid solution having a viscosity of 2400 cps at 23° C.

The polyamic acid solution obtained after completion of the reaction was cast to a thickness of 500~1000 μm on a glass substrate using a doctor blade, and dried in a vacuum oven at 40° C. for 1 hour and at 60° C. for 2 hours, thus obtaining a self-supporting film, which was then heated in a high-temperature oven at 80° C. for 3 hours, 100° C. for 1 hour, 200° C. for 1 hour and 300° C. for 30 min at a heating rate of 5° C./min, thereby manufacturing a polyimide film having a thickness of 50 μm.

Preparative Example 3

As in Preparative Example 2, 2.87357 g (0.007 mol) of 6-HMDA was dissolved in 32.2438 g of DMAc, after which 0.7449 g (0.003 mol) of 4-DDS was added thereto and completely dissolved, and 4.4425 g (0.01 mol) of 6-FDA was added thereto and stirred for 1 hour, thus completely dissolving the 6-FDA. The solid content was thus 20 wt %. The solution was then stirred at room temperature for 8 hours, thus obtaining a polyamic acid solution having a viscosity of 2300 cps at 23° C.

Thereafter, a polyimide film was manufactured in the same manner as in Preparative Example 2.

Preparative Example 4

As in Preparative Example 2, 4.1051 g (0.01 mol) of 6-HMDA was dissolved in 32.4623 g of DMAc, after which 3.1097 g (0.007 mol) of 6-FDA and 0.90078 g (0.003 mol) of TDA were added thereto and stirred for 1 hour, thus completely dissolving the 6-FDA and TDA. The solid content was thus 20 wt %. The solution was then stirred at room temperature for 8 hours, thus obtaining a polyamic acid solution having a viscosity of 2200 cps at 23° C.

Thereafter, a polyimide film was manufactured in the same manner as in Preparative Example 2.

Preparative Example 5

As in Preparative Example 2, 2.9233 g (0.01 mol) of APB-133 was dissolved in 29.4632 g of DMAc, after which 4.4425 g (0.01 mol) of 6-FDA was added thereto and stirred for hour, thus completely dissolving the 6-FDA. The solid content was thus 20 wt %. The solution was then stirred at room temperature for 8 hours, thus obtaining a polyamic acid solution having a viscosity of 1200 cps at 23° C.

Thereafter, a polyimide film was manufactured in the same manner as in Preparative Example 2.

The properties of the polyimide films manufactured in Preparative Examples 1~5 were measured as follows. The results are shown in Table 1 below.

Transmittance and Color Coordinates

The visible light transmittance of the polyimide film was measured using a UV spectrophotometer (Cary100, available from Varian).

The color coordinates of the polyimide film were measured using a UV spectrophotometer (Cary100, available from Varian) according to ASTM E 1347-06. As such, a standard illuminant was CIE D65.

(2) Yellowness Index

The yellowness index of the polyimide film was measured according to ASTM E313.

(3) Coefficient of Linear Thermal Expansion (CTE)

The average CTE of the polyimide film was determined at 50~250° C. according to a TMA method using a TMA (Q400, available from TA Instrument).

TABLE 1

| | | Thick. | CTE | | Transmittance | | | | | Color Coordinates | | |
|---|---|---|---|---|---|---|---|---|---|---|---|---|
| | | (μm) | (ppm/° C.) | Yellow. | 380 nm~780 nm | 551 nm~780 nm | 550 nm | 500 nm | 420 nm | L | a | b |
| Prep. Ex. | 1 | 50 | 21.6 | 2.46 | 86.9 | 90.5 | 89.8 | 89.3 | 84.6 | 96.22 | −0.27 | 1.03 |
| | 2 | 50 | 46 | 1.59 | 87.6 | 90.0 | 89.7 | 89.2 | 85.4 | 95.85 | −0.12 | 0.99 |
| | 3 | 50 | 35 | 2.76 | 87.9 | 89.6 | 89.5 | 89.0 | 58.6 | 95.61 | −0.42 | 1.91 |
| | 4 | 50 | 40 | 3.45 | 88.2 | 90.0 | 89.8 | 89.3 | 60.1 | 95.56 | −0.49 | 2.05 |
| | 5 | 50 | 46.0 | 6.46 | 83.8 | 88.8 | 87.2 | 84.8 | 73.2 | 94.6 | 0.59 | 5.09 |

Examples 1~10 & Comparative Examples 1~7
(Manufacture of Plastic Substrate)

On the plastic film (thickness of 50 μm) of each of Preparative Examples 1~5, a conductive metal was deposited thus forming a conductive metal layer, after which a polyimide varnish (the composition of polyamic acid of Preparative Examples 1~5 was used as the polyimide composition) including CNTs (SWNT, available from CNI) dispersed in an amount of 0.001~1 part by weight based on 100 parts by weight of the solid content of a transparent polyimide resin was applied in the form of a thin film through casting or spraying, thus forming a resin layer having CNTs dispersed therein. In another embodiment of the present invention, in the formation of the resin layer having CNTs dispersed therein, ITO powder was further added and dispersed in an amount of 5~25 parts by weight based on 100 parts by weight of the solid content of the polyimide resin, thus forming a resin layer (Examples 9 and 10).

The kind and thickness of the metal layer, the amount of CNTs or ITO powder of the resin layer having CNTs or ITO powder dispersed therein and the thickness thereof are shown in Table 2 below.

TABLE 2

| | | Conductive Metal layer | | Resin Layer having Dispersed Conductive Material | | |
|---|---|---|---|---|---|---|
| | Plastic Film | Kind | Thick. (nm) | Thick. (μm) | Amount of CNTs* | Amount of ITO Powder* |
| Ex. 1 | Prep. Ex. 1 | Mg | 10 | 0.4 | 0.01 | — |
| Ex. 2 | Prep. Ex. 2 | Mg | 10 | 1.2 | 0.01 | — |
| Ex. 3 | Prep. Ex. 1 | Mg | 10 | 2.5 | 0.01 | — |
| Ex. 4 | Prep. Ex. 5 | Mg | 50 | 2.5 | 0.01 | — |
| Ex. 5 | Prep. Ex. 1 | Al | 10 | 0.4 | 0.01 | — |

TABLE 2-continued

|  | Plastic Film | Conductive Metal layer | | Resin Layer having Dispersed Conductive Material | | |
|---|---|---|---|---|---|---|
|  |  | Kind | Thick. (nm) | Thick. (μm) | Amount of CNTs* | Amount of ITO Powder* |
| Ex. 6 | Prep. Ex. 2 | Al | 10 | 1.2 | 0.01 | — |
| Ex. 7 | Prep. Ex. 1 | Al | 10 | 2.5 | 0.01 | — |
| Ex. 8 | Prep. Ex. 5 | Al | 50 | 2.5 | 0.01 | — |
| Ex. 9 | Prep. Ex. 1 | Al | 10 | 2.5 | 0.01 | 5 |
| Ex. 10 | Prep. Ex. 1 | Al | 50 | 2.5 | 0.01 | 25 |
| C. Ex. 1 | Prep. Ex. 1 | — | — | — | — | — |
| C. Ex. 2 | Prep. Ex. 1 | — | — | 0.04 | 0.001 | — |
| C. Ex. 3 | Prep. Ex. 4 | — | — | 0.2 | 0.03 | — |
| C. Ex. 4 | Prep. Ex. 4 | — | — | 0.2 | 0.05 | — |
| C. Ex. 5 | Prep. Ex. 1 | — | — | 0.4 | 0.01 | — |
| C. Ex. 6 | Prep. Ex. 1 | — | — | 1.2 | 0.01 | — |
| C. Ex. 7 | Prep. Ex. 2 | — | — | 25 | 0.01 | — |

Note:
*represented by parts by weight based on 100 parts by weight of solid content of polyamic acid of varnish Experimental Example 1

The properties of the plastic substrates of Examples 1~10 and Comparative Examples 1~7 were evaluated as follows. The results are shown in Table 3 below.

(1) Optical Properties

The visible light transmittance of the plastic substrate was measured using a UV spectrophotometer (Cary100, available from Varian).

As is apparent from the results of Table 3 below, in the case where the amount of CNTs was increased to reduce surface resistivity as in the comparative examples, transmittance was drastically decreased. Thereby, in the case of the electrode using only CNTs, surface resistivity necessary for a display could not be achieved.

According to the embodiment of the present invention, in the case where the CNT transparent electrode was formed on the conductive metal layer, the amount of CNTs was reduced compared to a conventional electrode made of CNTs, resulting in low surface resistivity and a high light transmittance of 70% or more. Thus, the CNT transparent electrode according to the present invention could be used as a transparent electrode for a display.

Also, in the case of the transparent electrode using only CNTs, a significant difference in surface resistivity of the electrode was greatly affected by the degree of dispersion of CNTs, undesirably causing difficulties in the manufacturing process including dispersion. However, in the case of the transparent electrode manufactured according to the embodiment of the present invention, the metal layer was fundamentally responsible for a predetermined electrode function, thereby lowering a probability of failing to produce an image due to the loss of the electrode function in the fabrication of a display device.

(2) Surface Resistivity

The surface resistivity was measured ten times using a high ohmmeter (Hiresta-UP MCT-HT450, available from Mitsubishi Chemical Corporation, measurement range: $10 \times 10^5 \sim 10 \times 10^{15}$) and a low ohmmeter (CMT-SR 2000N, available from Advanced Instrument Technology, 4-Point Probe System, measurement range: $10 \times 10^{-3} \sim 10 \times 10^5$), and then averaged.

As is apparent from the results of Table 3 below, in the case of the transparent electrode according to the embodiment of the present invention, when the CNTs were used in the same amount, surface resistivity could be much lower, compared to the transparent electrode having only the CNT layer (Comparative Examples 5 to 7). Thus, compared to the transparent electrode composed exclusively of CNTs, the transparent electrode according to the present invention could accomplish higher transmittance.

(3) Cracking of Plastic Substrate

In the case of a plastic substrate having a conductive metal layer, in order to use the conductive metal layer as an electrode, the conductive metal layer is deposited to be thick on a plastic film. Thereby, upon bending of the plastic substrate, the metal layer may be stripped and may crack attributable to the difference in flexibility between the plastic substrate and the metal layer, and may thus lose the ability to function as an electrode. However, in the case of the plastic substrate according to the embodiment of the present invention, in addition to the conductive metal layer, the resin layer having the conductive material dispersed therein is also formed, and thus the conductive metal layer may be formed to be thinner. Furthermore, problems related to stripping and cracking of the conductive metal layer based on the difference in dimensional stability occurring upon bending of the plastic substrate may be alleviated thanks to the resin of the resin layer and the plastic film formed on upper and lower surfaces of the conductive metal layer, thereby increasing stripping resistance and cracking resistance upon bending of the display and of the substrate, compared to a monolayered electrode structure of a conventional conductive metal layer.

Specific evaluation results with regard thereto are not shown in Table 3.

(4) Gas & Water Vapor Barrier Properties

Oxygen Transmission Rate (OTR)

The OTR was measured ten times under conditions of 23° C. and 0% RH using Mocon Oxytran 1000 according to ASTM D-39859, and then averaged.

Water Vapor Transmission Rate (WVTR)

The WVTR was measured ten times under conditions of 38° C. and 90% RH using Mocon Aquatran Model 1 according to ASTM F-1249, and then averaged.

Because the film itself contains air or water vapor and has high air or water vapor permeability, there is a concern about the production of foam due to permeation of air or water vapor from the outside or the film into the liquid crystal layer or the organic light-emitting layer, or oxidation of the liquid crystal layer or the organic light-emitting layer by water vapor and oxygen, undesirably reducing the lifespan and properties of the display device. In order to solve the above problems, a barrier layer for blocking gas and water vapor may be provided in the form of a monolayer structure of an inorganic layer or a multilayer structure of an organic layer and an inorganic layer on the inner surface and/or the outer surface of a film used as the substrate. Namely, the barrier layer may block air or water vapor from the outside and also air or water vapor contained in the film itself.

However, the conductive metal layer of the plastic substrate according to the present invention is formed on the plastic film acting as a substrate and thus plays a role as an electrode and as a gas barrier layer, thus reducing the manufacturing cost of the display device and prolonging the lifespan thereof, which can be confirmed from the results of OTR and WVTR of Table 3.

TABLE 3

| | Surface Resistivity (Ω/Sq) | Transmittance (500 nm, %) | OTR (cc/M²Day) | WVTR (g/M2Day) |
|---|---|---|---|---|
| Ex. 1 | $2.2 \times 10^6$ | 81.2 | 0.025 | 0.068 |
| Ex. 2 | $1.9 \times 10^6$ | 81.2 | 0.02 | 0.054 |
| Ex. 3 | $4.2 \times 10^5$ | 83.4 | 0.01 | 0.028 |
| Ex. 4 | $2.2 \times 10^2$ | 80.1 | 0.004 | 0.012 |
| Ex. 5 | $5.0 \times 10^5$ | 79.7 | 0.029 | 0.059 |
| Ex. 6 | $2.0 \times 10^5$ | 81.5 | 0.022 | 0.051 |
| Ex. 7 | $4.2 \times 10^4$ | 84.4 | 0.01 | 0.035 |
| Ex. 8 | $6.0 \times 10^1$ | 81.1 | 0.004 | 0.016 |
| Ex. 9 | $3.6 \times 10^2$ | 85.2 | 0.0096 | 0.03 |
| Ex. 10 | $7.0 \times 10^1$ | 85.6 | 0.0032 | 0.012 |
| C. Ex. 1 | $>10^{13}$ | 89.3 | 57 | 17.8 |
| C. Ex. 2 | $3.2 \times 10^{11}$ | 89 | 20.9 | 8 |
| C. Ex. 3 | $2.2 \times 10^3$ | 75 | 3.5 | 5 |
| C. Ex. 4 | $1.2 \times 10^1$ | 54 | 1.7 | 1.2 |
| C. Ex. 5 | $3.0 \times 10^3$ | 77.3 | 0.9 | 3 |
| C. Ex. 6 | $1.9 \times 10^7$ | 75.2 | 0.5 | 1.1 |
| C. Ex. 7 | $4.2 \times 10^6$ | 72.2 | 0.29 | 0.9 |

Examples 11~23 & Comparative Examples 8~14
(Manufacture of Transparent Electrode Film)

On the plastic film of each of Preparative Examples 1~5, ITO or IZO was deposited and then the deposited ITO or IZO layer was patterned through photolithography and etching, thus forming a stripe-shaped transparent electrode.

On the ITO or IZO transparent electrode, a polyimide varnish (the composition of polyamic acid of Preparative Examples 1~5 was used as the polyimide composition) including CNTs (SWNT, available from CNI) dispersed in an amount of 0.001~1 wt % based on the weight of solid content of a transparent polyimide resin was applied in the form of a thin film through casting or spraying, thus forming a resin layer having CNTs dispersed therein. According to another embodiment of the present invention, in the formation of the resin layer having CNTs dispersed therein, ITO powder was further added and dispersed in an amount of 5~25 parts by weight based on 100 parts by weight of the solid content of the polyimide resin, thus forming a resin layer (Examples 20 and 21).

The thickness of the deposited ITO or IZO layer, and the amounts of CNTs and ITO powder and the thickness of the resin layer having dispersed CNTs are shown in Table 4 below.

TABLE 4

| | Plastic Film | ITO Layer Thick. (nm) | IZO Layer Thick. (nm) | Resin Layer having Dispersed Conductive Material | | |
|---|---|---|---|---|---|---|
| | | | | Thick. (μm) | Amount of CNTs* | Amount of ITO Powder* |
| Ex. 11 | Prep. Ex. 1 | 50 | — | 0.4 | 0.01 | — |
| Ex. 12 | Prep. Ex. 2 | 50 | — | 1.2 | 0.01 | — |
| Ex. 13 | Prep. Ex. 1 | 50 | — | 2.5 | 0.01 | — |
| Ex. 14 | Prep. Ex. 5 | 100 | — | 0.4 | 0.02 | — |
| Ex. 15 | Prep. Ex. 1 | 100 | — | 1.2 | 0.02 | — |
| Ex. 16 | Prep. Ex. 2 | 100 | — | 2.5 | 0.02 | — |
| Ex. 17 | Prep. Ex. 1 | 150 | — | 0.4 | 0.05 | — |
| Ex. 18 | Prep. Ex. 5 | 150 | — | 1.2 | 0.05 | — |
| Ex. 19 | Prep. Ex. 1 | 150 | — | 2.5 | 0.05 | — |
| Ex. 20 | Prep. Ex. 1 | 50 | — | 2.5 | 0.01 | 5 |
| Ex. 21 | Prep. Ex. 1 | 50 | — | 2.5 | 0.01 | 25 |
| Ex. 22 | Prep. Ex. 1 | — | 100 | 2.5 | 0.01 | — |
| Ex. 23 | Prep. Ex. 1 | — | 150 | 2.5 | 0.01 | — |
| C. Ex. 8 | Prep. Ex. 2 | 50 | — | — | — | — |
| C. Ex. 9 | Prep. Ex. 3 | 100 | — | — | — | — |
| C. Ex. 10 | Prep. Ex. 1 | 150 | — | — | — | — |
| C. Ex. 11 | Prep. Ex. 1 | 200 | — | — | — | — |
| C. Ex. 12 | Prep. Ex. 1 | 300 | — | — | — | — |
| C. Ex. 13 | Prep. Ex. 1 | — | — | — | — | 25 |
| C. Ex. 14 | Prep. Ex. 1 | — | 150 | — | — | — |

Note:
*represented by parts by weight based on 100 parts by weight of solid content of polyamic acid of varnish Experimental Example 2

The properties of the transparent electrode films of Examples 11~23 and Comparative Examples 8~14 were evaluated as follows. The results are shown in Table 5 below.
(1) Optical Properties
The visible light transmittance of the transparent electrode film was measured using a UV spectrophotometer (Cary100, available from Varian).

As is apparent from the results of Table 5 below, as the thickness of the deposited ITO or IZO layer was increased, surface resistivity was reduced and transmittance was increased. However, in the case where the thickness of the ITO layer (or IZO layer) was increased to the level of 200~300 nm or more, upon bending of the electrode film, stripping of the ITO layer (or IZO layer) from the plastic film and cracking of the ITO layer (or IZO layer) were caused which undesirably degraded electrode performance. In the case of the electrode having thick ITO, bending per se is difficult or the substrate is very inflexible, thus reducing flexibility required in the present invention.

According to the embodiment of the present invention, in the case where the resin layer having the conductive material dispersed therein is formed on the ITO layer (or IZO layer), it is possible to reduce the thickness of the ITO layer (or IZO layer) necessary for achieving the same surface resistivity, compared to a transparent electrode film having only the ITO layer (or IZO layer). Even when the amount of the conductive material of the resin layer having the dispersed conductive material is used in a very small amount, desired surface resistivity may be attained due to the presence of the ITO layer (or IZO layer). Thus, when the resin layer having the conductive material dispersed therein is formed, it barely obstructs the transmission of light. Also, because the resin layer having the conductive material dispersed therein is also a colorless resin having high transmittance, transmittance similar to that of a thick film composed exclusively of the ITO layer (or IZO layer) can be exhibited. As mentioned below, the transparent electrode film according to the embodiment of the present invention including the resin layer having the conductive material dispersed therein can exhibit a corrective function for stripping and cracking of the ITO layer (or IZO layer).
(2) Surface Resistivity
The surface resistivity was measured ten times using a high ohmmeter (Hiresta-UP MCT-HT450, available from Mitsubishi Chemical Corporation, measurement range:

$10\times10^5$~$10\times10^{15}$) and a low ohmmeter (CMT-SR 2000N, available from Advanced Instrument Technology, 4-Point Probe System, measurement range: $10\times10^{-3}$~$10\times10^5$), and then averaged.

As is apparent from the results of Table 5 below, in the case of the transparent electrode according to the embodiment of the present invention, when the CNTs were used in the same amount, surface resistivity could be much lower, compared to the transparent electrode composed exclusively of CNTs. Thus, compared to the transparent electrode composed exclusively of CNTs, the transparent electrode according to the present invention could realize higher transmittance.

(3) ITO Bending

As is apparent from the results of Table 5, as the thickness of the deposited ITO layer increased, surface resistivity was reduced and transmittance was increased. In the case where an electrode film having the ITO layer having an increased thickness is bent, cracking of the ITO layer may occur, undesirably degrading electrode performance. In the case of an electrode having thick ITO, bending per se is difficult or the substrate becomes very inflexible, thus reducing flexibility. According to the embodiment of the present invention, however, in the case where the resin layer having the conductive material dispersed therein is formed on the ITO layer (or IZO layer), the thickness of the ITO layer necessary for achieving desired surface resistivity and light transmittance may be relatively decreased, and thus the flexibility of the transparent electrode is increased, compared to a conventional electrode film structure. As well, the ITO layer (or IZO layer) is protected with the flexible polymer resin at the upper and lower surfaces thereof thanks to the resin of the resin layer having the conductive material dispersed therein, and thus the generation of cracking may be reduced upon bending, compared to the conventional ITO electrode.

As mentioned above, according to the embodiments of the present invention, the transparent electrode has high electrical conductivity and high transmittance even when it has a low thickness, and is provided in the form of a thin film using an inexpensive material and achieves superior transmittance, compared to a conventional monolayered transparent electrode made of CNTs or ITO.

Upon fabrication of an active matrix panel using a metal such as Ag, Mg or Ba, ohmic contact may be easily formed at a junction with a device such as a thin film transistor. Upon formation of an organic EL device, a transparent electrode containing Ag having a high work function may be used as an anode, and a transparent electrode containing Ca or Mg may be used as a cathode.

TABLE 5

| | Surface Resistivity ($\Omega$/Sq) | Transmittance (500 nm, %) | OTR (cc/M2Day) | WVTR (g/M2Day) |
|---|---|---|---|---|
| Ex. 11 | $7.0 \times 10^2$ | 88.2 | 0.026 | 0.06 |
| Ex. 12 | $4.7 \times 10^2$ | 87.9 | 0.024 | 0.051 |
| Ex. 13 | $2.8 \times 10^2$ | 87.7 | 0.018 | 0.047 |
| Ex. 14 | $5.0 \times 10^2$ | 86.9 | 0.0085 | 0.035 |
| Ex. 15 | $2.0 \times 10^2$ | 86.2 | 0.0077 | 0.03 |
| Ex. 16 | $6.0 \times 10^1$ | 85.8 | 0.0068 | 0.027 |
| Ex. 17 | $5.0 \times 10^1$ | 86.3 | 0.006 | 0.022 |
| Ex. 18 | $3.0 \times 10^1$ | 85.8 | 0.0045 | 0.016 |
| Ex. 19 | $2.3 \times 10^1$ | 85.1 | 0.004 | 0.012 |
| Ex. 20 | $4.5 \times 10^1$ | 88.2 | 0.0038 | 0.011 |
| Ex. 21 | $2.2 \times 10^1$ | 88.2 | 0.0015 | 0.006 |
| Ex. 22 | $1.5 \times 10^2$ | 86.4 | 0.004 | 0.013 |
| Ex. 23 | $5.2 \times 10^1$ | 87.3 | 0.0017 | 0.007 |

TABLE 5-continued

| | Surface Resistivity ($\Omega$/Sq) | Transmittance (500 nm, %) | OTR (cc/M2Day) | WVTR (g/M2Day) |
|---|---|---|---|---|
| C. Ex. 8 | $2.0 \times 10^3$ | 87.2 | 0.03 | 0.062 |
| C. Ex. 9 | $7.0 \times 10^2$ | 86.9 | 0.01 | 0.041 |
| C. Ex. 10 | $5.0 \times 10^2$ | 87.8 | 0.0069 | 0.027 |
| C. Ex. 11 | $4.0 \times 10^1$ | 87.5 | 0.004 | 0.015 |
| C. Ex. 12 | $6.0 \times 10^0$ | 86.7 | 0.003 | 0.011 |
| C. Ex. 13 | $4.0 \times 10^2$ | 87.1 | 0.04 | 0.15 |
| C. Ex. 14 | $8.0 \times 10^2$ | 87.9 | 0.0045 | 0.019 |

Reference Examples 1~6 & Comparative Sample

On the plastic film (thickness of 50 μm) of each of Preparative Examples 1~5, a reflective metal as shown in Table 6 below was deposited thus forming a reflective metal layer, after which the reflectivity of the metal layer was measured.

The structure of a reflector used for evaluating the reflective properties is described below.

On the surface of the plastic substrate, the metal layer was formed through the above method, and a transparent plastic passivation layer or an electrode layer using a transparent plastic resin was formed on the metal layer, thus manufacturing a plastic substrate including the plastic substrate and the metal layer formed thereon, which was then used as an evaluation sample.

As such, the reflective properties were evaluated in such a manner that the metal layer of the plastic substrate was formed under a transparent passivation layer or a transparent electrode layer of a reflective liquid crystal display device and thus external light was transmitted through the polyimide film of the transparent passivation layer or the transparent electrode layer via the front surface of the liquid crystal display device and was then diffused and reflected by the metal layer.

A measurement system used in the measurement of luminance of the reflector is described below.

Figure 14:
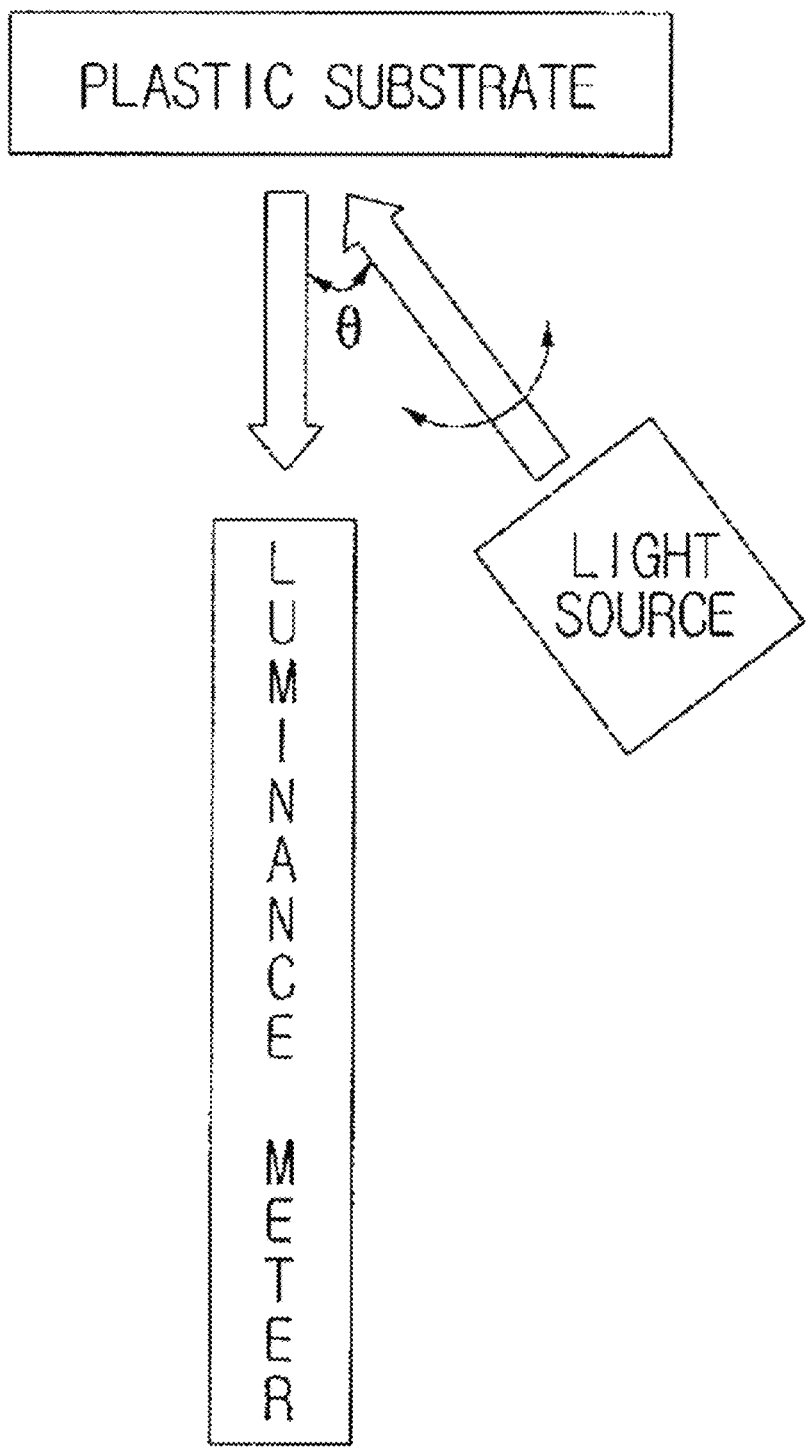
FIG. 14 is a view showing a process of measuring luminance for determining reflectivity of the plastic substrate according to the embodiment of the present invention.

This measurement system is illustrated in FIG. 14. A luminance meter was disposed at a predetermined position above a plastic substrate having a reflective plate, and a light source was disposed at the side of the reflective plate. The angle formed by incident light emitted from the light source and reflected light is defined as an incidence angle θ, and this light source is movable to a predetermined position so that the incidence angle θ varies. As the light source, white light was used, and a polarization film was not used in the measurement system. Subsequently, while the incidence angle θ was varied in the range of 7.4°~35.6°, white light was emitted from the light source, and luminance of light reflected from the metal layer was measured using the luminance meter, thereby evaluating dependence of luminance on the incidence angle θ.

Also, a ceramic type standard white diffusion plate was prepared, and the dependence of luminance of light reflected from the standard white diffusion plate on the incidence angle θ was measured as above, and determined as a base value of luminance of reflected light.

Then, the luminance value obtained from the plastic substrate was divided by the luminance value of the standard white diffusion plate, and then multiplied by 100. Namely, when the luminance of the standard white diffusion plate was 100, the relative luminance value of the plastic substrate was determined.

The results are shown in Table 6 below.

TABLE 6

| | Plastic Film | Reflective Metal layer | | Reflective Properties | | | | | |
| --- | --- | --- | --- | --- | --- | --- | --- | --- | --- |
| | | Kind | Thick. (nm) | 7.4° | 17.7° | 22.3° | 26.6° | 31.8° | 35.6° |
| Ref. Ex. 1 | Prep. Ex. 1 | Mg | 10 | 486 | 249 | 196 | 112 | 91 | 14 |
| Ref. Ex. 2 | Prep. Ex. 2 | Mg | 10 | 470 | 267 | 218 | 122 | 109 | 19 |
| Ref. Ex. 3 | Prep. Ex. 5 | Mg | 50 | 468 | 264 | 204 | 128 | 112 | 14 |
| Ref. Ex. 4 | Prep. Ex. 1 | Al | 10 | 493 | 278 | 218 | 99 | 91 | 11 |
| Ref. Ex. 5 | Prep. Ex. 2 | Al | 10 | 487 | 280 | 220 | 130 | 116 | 15 |
| Ref. Ex. 6 | Prep. Ex. 5 | Al | 50 | 476 | 284 | 210 | 138 | 122 | 29 |
| Comp. Sample | — | — | — | 443 | 279 | 222 | 173 | 134 | 91 |

As is apparent from the results of Table 6, in the reflective properties of the plastic substrate having the metal layer, when the incidence angle θ was 7.4°, 17.7° and 22.3°, the luminance of the reflected light was almost the same as that of the comparative sample, but was increased about 2.2~4.4 times that of the standard white diffusion plate.

In this way, the plastic substrate manufactured through the method of manufacturing the reflector according to the embodiment of the present invention had higher luminance than that of the standard white diffusion plate at almost all of the incidence angles, and also had higher luminance of incident light having a large incidence angle θ, namely, incident light reflected at the side of the metal layer, than that of the comparative sample.

Although the above evaluation was performed in a state in which the transparent electrode layer was formed on the metal layer of the plastic substrate so that incident light was transmitted through the polyimide film and then diffused and reflected, luminance of reflected light higher than that of the standard white diffusion plate was obtained. Thereby, it could be confirmed that the polyimide film was very transparent and thus did not cause any problem even in the above configuration.

Even when light was radiated from the metal layer side, reflective properties equal or superior to those of the present evaluation results could be obtained.

Because the plastic substrate according to the present invention has a uniform refractive index throughout the polyimide film, even when it is disposed such that incident light is transmitted through the polyimide film and then diffused and reflected, it may be used as the reflector which does not depolarize light.

Although not specified, luminance La when disposing a polarization film having a polarization axis parallel to the light source side and the luminance meter side in the above measurement system, and luminance Lb when disposing a polarization film having a polarization axis perpendicular to the light source side and the luminance meter side were measured, and La/Lb (contrast ratio) was calculated, thus obtaining the La/Lb value greater than that of the reflector having a composition of materials having different refractive indices in the conventional resin. This indicates that the plastic substrate according to the present invention is a reflector which does not generate any depolarization effect.

The invention claimed is:

1. A plastic substrate, comprising:
a plastic film;
a reflective metal layer formed on the plastic film, wherein the reflective metal layer has a thickness ranging from 1 to 1000 nm;
a resin layer formed on the reflective metal layer, wherein the resin layer has a thickness ranging from 10 nm to 25.5 µm,
wherein the plastic film and the resin layer are made of polyimides,
wherein the polyimides have an average coefficient of linear thermal expansion of 50.0 ppm/° C. or less when measured in a temperature range from 50° C. to 250° C. using a thermomechanical analyzer for a film thickness of 50-100 µm, with a yellowness index of 15 or less,
wherein the reflective metal layer has a multilayered structure,
wherein the reflective metal layer comprises a lower metal layer and an upper metal layer,
wherein the lower metal layer is made of at least one metal selected from the group consisting of aluminum, magnesium and alloys thereof; and
wherein the upper metal layer is made of ITO (indium tin oxide) or IZO (indium zinc oxide), and
wherein the plastic substrate has a light transmittance of 50% or more at a wavelength of 500 nm and a surface resistivity of $2.5 \times 10^6 \Omega$/sq or less.

2. The plastic substrate according to claim 1, wherein the polyimides of the plastic film and the resin layer have an average transmittance of 85% or more at 380-780 nm when measured using a UV spectrophotometer for a film thickness of 50-100 µm.

3. The plastic substrate according to claim 1, wherein the polyimides of the plastic film and the resin layer have a transmittance of 88% or more at 550 nm and a transmittance of 70% or more at 420 nm when measured using a UV spectrophotometer for a film thickness of 50-100 µm.

4. The plastic substrate according to claim 1, wherein the polyimide of the plastic film has color coordinates in which L is 90 or more, a is 5 or less and b is 5 or less when measured using a UV spectrophotometer for a film thickness of 50-100 µm.

5. The plastic substrate according to claim 1, wherein the reflective metal layer has a thickness of 10-1,000 nm.

6. The plastic substrate according to claim 1, wherein the reflective metal layer has a thickness of 50-300 nm.

7. The plastic substrate according to claim 1, further comprising a chemical resistance layer formed on at least one surface of the plastic film.

8. The plastic substrate according to claim 7, wherein the chemical resistance layer comprises at least one resin selected from the group consisting of an acrylic resin, an epoxy-based resin, polysilazane and a polyimide-based resin.

9. The plastic substrate according to claim 1,
further comprising an inorganic layer formed on a lower surface of the plastic film or a lower surface of the resin layer,
wherein the lower surface of the plastic film is an opposite surface of the side on which the reflective metal layer is formed, and
wherein the lower surface of the resin layer is a surface of a direction in which the plastic film is formed.

10. The plastic substrate according to claim 9,
wherein the inorganic layer is provided in a form of a monolayer or multilayer structure using at least one inorganic material selected from the group consisting of $SiN_x$, $Al_xO_y$, and $SiO_x$.

11. The plastic substrate according to claim 1,
further comprising a metal oxide layer formed on an upper surface or a lower surface of the resin layer,
wherein the lower surface of the resin layer is a surface of a direction in which the plastic film is formed, and
wherein the upper surface of the resin layer is an opposite surface of the lower surface of the resin layer.

12. The plastic substrate according to claim 11,
wherein the metal oxide layer comprises silver oxide (AgO).

13. A transmissive electronic paper display device, comprising the plastic substrate of claim 1 as a substrate.

14. A display device, comprising the plastic substrate of claim 1 as a substrate.

15. An organic electroluminescent device, comprising the plastic substrate of claim 1 as a substrate.

16. A plastic substrate, comprising:
a plastic film;
a conductive metal layer formed on the plastic film, wherein the conductive metal layer has a thickness ranging from 1 to 1000 nm;
a resin layer formed on the conductive metal layer, wherein the resin layer has a thickness ranging from 10 nm to 25.5 μm,
a metal oxide layer formed on an upper surface or a lower surface of the resin layer, wherein the lower surface of the resin layer is a surface of a direction in which the plastic film is formed, and wherein the upper surface of the resin layer is an opposite surface of the lower surface of the resin layer
wherein the plastic film and the resin layer are made of polyimides,
wherein the polyimides have an average coefficient of linear thermal expansion of 50.0 ppm/° C. or less when measured in a temperature range from 50° C. to 250° C. using a thermomechanical analyzer for a film thickness of 50-100 μm, with a yellowness index of 15 or less,
wherein the conductive metal layer is made of indium tin oxide or indium zinc oxide, and
wherein the metal oxide layer comprises silver oxide (AgO).

17. The plastic substrate according to claim 16,
wherein the conductive metal layer has a strip-shaped pattern.

18. The plastic substrate according to claim 17,
wherein the plastic substrate has a surface resistivity of 700 Ω/sq or less.

19. The plastic substrate according to claim 16,
wherein the conductive metal layer is made of indium tin oxide.

20. The plastic substrate according to claim 16,
wherein the conductive metal layer has a thickness of 1-300 nm.

21. The plastic substrate according to claim 16,
wherein the conductive metal layer has a thickness of 1-100 nm.

22. The plastic substrate according to claim 16,
wherein the conductive metal layer has a thickness of 1-50 nm.

23. The plastic substrate according to claim 1,
wherein the resin layer comprises at least one layer selected from the group consisting of a resin layer having a conductive material dispersed therein and a passivation layer.

24. The plastic substrate according to claim 23,
wherein the resin layer having the conductive material dispersed therein is formed from a polyimide varnish having a conductive material dispersed therein.

25. The plastic substrate according to claim 24,
wherein the conductive material comprises carbon nanotubes or indium tin oxide powder.

26. The plastic substrate according to claim 25,
wherein the indium tin oxide powder contains 80-95 wt % of indium oxide and 5-20 wt % of tin oxide.

27. The plastic substrate according to claim 23,
wherein the resin layer having the conductive material dispersed therein is formed from a polyimide varnish containing 0.001-1 part by weight of carbon nanotubes based on 100 parts by weight of a solid content of a polyimide resin.

28. The plastic substrate according to claim 23,
wherein the resin layer having the conductive material dispersed therein is formed from a polyimide varnish containing 2-100 parts by weight of indium tin oxide powder based on 100 parts by weight of a solid content of a polyimide resin.

29. The plastic substrate according to claim 23,
wherein the resin layer having the conductive material dispersed therein has a thickness ranging from 10 nm to 25 μm.

30. The plastic substrate according to claim 23,
wherein the passivation layer is a polyimide layer having a thickness ranging from 10 nm to 500 nm.

31. The plastic substrate according to claim 16,
wherein the resin layer comprises at least one layer selected from the group consisting of a resin layer having a conductive material dispersed therein and a passivation layer.

32. The plastic substrate according to claim 16,
further comprising a chemical resistance layer formed on at least one surface of the plastic film.

33. The plastic substrate according to claim 32,
wherein the chemical resistance layer comprises at least one resin selected from the group consisting of an acrylic resin, an epoxy-based resin, polysilazane and a polyimide-based resin.

34. The plastic substrate according to claim 16,
further comprising an inorganic layer formed on a lower surface of the plastic film or a lower surface of the resin layer,
wherein the lower surface of the plastic film is an opposite surface of the side on which the metal layer is formed, and
wherein the lower surface of the resin layer is a surface of a direction in which the plastic film is formed.

35. The plastic substrate according to claim 34,
wherein the inorganic layer is provided in a form of a monolayer or multilayer structure using at least one inorganic material selected from the group consisting of $SiN_x$, $Al_xO_y$, and $SiO_x$.

36. A transmissive electronic paper display device, comprising the plastic substrate of claim 16 as a substrate.

37. A display device, comprising the plastic substrate of claim 16 as a substrate.

38. An organic electroluminescent device, comprising the plastic substrate of claim 16 as a substrate.

* * * * *